(12) United States Patent
Yeh et al.

(10) Patent No.: US 10,732,391 B2
(45) Date of Patent: Aug. 4, 2020

(54) IMAGE SYSTEM LENS ASSEMBLY, IMAGING APPARATUS AND ELECTRONIC DEVICE

(71) Applicant: LARGAN PRECISION CO., LTD., Taichung (TW)

(72) Inventors: Kuan-Ting Yeh, Taichung (TW); Tzu-Chieh Kuo, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 282 days.

(21) Appl. No.: 15/790,371

(22) Filed: Oct. 23, 2017

(65) Prior Publication Data

US 2019/0056570 A1 Feb. 21, 2019

(30) Foreign Application Priority Data

Aug. 15, 2017 (TW) .............................. 106127594 A

(51) Int. Cl.
| | | |
|---|---|---|
| *G02B 3/02* | (2006.01) | |
| *G02B 13/18* | (2006.01) | |
| *G02B 13/02* | (2006.01) | |
| *G02B 9/60* | (2006.01) | |
| *G02B 13/00* | (2006.01) | |

(52) U.S. Cl.
CPC ............... *G02B 13/02* (2013.01); *G02B 9/60* (2013.01); *G02B 13/0045* (2013.01)

(58) Field of Classification Search
CPC .... G02B 13/00; G02B 13/004; G02B 13/009; G02B 13/0045; G02B 13/02; G02B 13/16; G02B 13/18; G02B 1/041; G02B 9/60–64; G02B 13/04; G02B 13/22; A61B 1/00096; A61B 1/041
USPC ........ 359/649, 676, 680–685, 713–715, 740, 359/753, 763–770, 784, 789, 791; 348/335, 340, 240.3, 241, 360, 361; 396/111
See application file for complete search history.

(56) References Cited

U.S. PATENT DOCUMENTS

| | | |
|---|---|---|
| 6,188,524 B1 | 2/2001 | Hayashi et al. |
| 8,508,836 B2 | 8/2013 | Ohtsu |
| 8,520,124 B2 * | 8/2013 | Ozaki .................... G02B 13/18 348/240.3 |
| 8,625,208 B2 | 1/2014 | Abe |
| 9,151,931 B1 | 10/2015 | Chen |
| 9,223,118 B2 | 12/2015 | Mercado |
| 9,402,032 B2 | 7/2016 | Dror et al. |

(Continued)

FOREIGN PATENT DOCUMENTS

| | | |
|---|---|---|
| CN | 102053342 A | 5/2011 |
| CN | 105467563 A | 4/2016 |

(Continued)

*Primary Examiner* — Mustak Choudhury
(74) *Attorney, Agent, or Firm* — Locke Lord LLP; Tim Tinkang Xia, Esq.

(57) ABSTRACT

An image system lens assembly includes five lens elements, the five lens elements being, in order from an object side to an image side: a first lens element; a second lens element having an object side-surface being convex in a paraxial region thereof; a third lens element having negative refractive power; a fourth lens element with positive refractive power having an image-side surface being convex in a paraxial region thereof; and a fifth lens element having negative refractive power.

27 Claims, 24 Drawing Sheets

(56) References Cited

U.S. PATENT DOCUMENTS

| | | |
|---|---|---|
| 9,488,807 B2 | 11/2016 | Liao et al. |
| 9,568,712 B2 | 2/2017 | Dror et al. |
| RE46,352 E | 3/2017 | Kubota et al. |
| 2010/0220229 A1 | 9/2010 | Sano |
| 2011/0134305 A1 | 6/2011 | Sano |
| 2011/0273611 A1 | 11/2011 | Matsusaka et al. |
| 2012/0021802 A1 | 1/2012 | Sano et al. |
| 2012/0026369 A1 | 2/2012 | Sano et al. |
| 2012/0075721 A1 | 3/2012 | Konishi et al. |
| 2013/0010181 A1 | 1/2013 | Baba |
| 2013/0016278 A1* | 1/2013 | Matsusaka ......... G02B 13/0045 348/360 |
| 2013/0169852 A1 | 7/2013 | Sano et al. |
| 2013/0176469 A1 | 7/2013 | Sano et al. |
| 2015/0077863 A1 | 3/2015 | Shinohara et al. |
| 2015/0098010 A1 | 4/2015 | Hsu et al. |
| 2016/0033741 A1 | 2/2016 | Hsu |
| 2016/0377833 A1 | 12/2016 | Liu et al. |
| 2016/0377834 A1 | 12/2016 | Liu et al. |
| 2016/0377837 A1 | 12/2016 | Liu et al. |
| 2016/0377838 A1 | 12/2016 | Liu et al. |
| 2017/0023773 A1 | 1/2017 | Chen et al. |
| 2017/0097498 A1 | 4/2017 | Amanai |
| 2019/0121104 A1 | 4/2019 | Zhang et al. |

FOREIGN PATENT DOCUMENTS

| | | |
|---|---|---|
| CN | 106094163 A | 11/2016 |
| CN | 106094164 A | 11/2016 |
| CN | 106154493 A | 11/2016 |
| CN | 106154494 A | 11/2016 |
| CN | 106154515 A | 11/2016 |
| CN | 106154516 A | 11/2016 |
| CN | 106646829 A | 5/2017 |
| JP | 2009-86566 A | 4/2009 |
| JP | 2010-8562 A | 1/2010 |
| WO | 2011021271 A1 | 2/2011 |
| WO | 2011118554 A1 | 9/2011 |
| WO | 2012132456 A1 | 10/2012 |
| WO | 2017078255 A1 | 5/2017 |

\* cited by examiner

IMAGE SYSTEM LENS ASSEMBLY, IMAGING APPARATUS AND ELECTRONIC DEVICE

RELATED APPLICATIONS

This application claims priority to Taiwan Application Serial Number 106127594, filed on Aug. 15, 2017, which is incorporated by reference herein in its entirety.

BACKGROUND

Technical Field

The present disclosure relates to an image system lens assembly and an imaging apparatus, and more particularly, to an image system lens assembly and an imaging apparatus applicable to electronic devices.

Description of Related Art

With the ever-changing technology and wider applications of image capturing modules, electronic devices equipped with image capturing modules have been developed in a trend to have even more functions than ever. Image capturing modules with only one lens unit have difficulties in meeting various shooting requirements such as telephoto and macro photo concurrently. Therefore, portable electronic devices such as smartphones usually adopt image capturing modules with two or more lens units in order to be applicable in a wider range.

However, conventional image capturing modules with telephoto shooting functions fail to achieve a balance between image qualities, the telephoto functions and miniaturizations due to the restriction of view angle. Thus, telephoto image capturing modules used in the portable electronics with only limited space provided thereto can hardly achieve high image quality.

SUMMARY

According to one aspect of the present disclosure, an image system lens assembly, includes five lens elements, the five lens elements being, in order from an object side to an image side: a first lens element; a second lens element having an object side-surface being convex in a paraxial region thereof; a third lens element having negative refractive power; a fourth lens element with positive refractive power having an image-side surface being convex in a paraxial region thereof; and a fifth lens element having negative refractive power, wherein an axial distance between an image-side surface of the fifth lens element and an image surface is BL, an axial distance between the second lens element and the third lens element is T23, an axial distance between the third lens element and the fourth lens element is T34, an axial distance between an object-side surface of the first lens element and the image surface is TL, a focal length of the image system lens assembly is f, and the following conditions are satisfied:

$0.10 < BL/T23 < 1.20;$ $0.10 < T23/T34 < 7.5;$ $0 < TL/f < 1.0.$

According to another aspect of the present disclosure, an image system lens assembly, includes five lens elements, the five lens elements being, in order from an object side to an image side: a first lens element having positive refractive power; a second lens element with negative refractive power having an object side-surface being convex in a paraxial region thereof; a third lens element; a fourth lens element having positive refractive power; and a fifth lens element, wherein an axial distance between an image-side surface of the fifth lens element and an image surface is BL, an axial distance between the second lens element and the third lens element is T23, an axial distance between the third lens element and the fourth lens element is T34, an axial distance between the fourth lens element and the fifth lens element is T45, an axial distance between an object-side surface of the first lens element and the image surface is TL, a focal length of the image system lens assembly is f, a central thickness of the fifth lens element is CT5, and the following conditions are satisfied:

$0.10 < BL/T23 < 1.20;$ $0.10 < T23/T34 < 5.8;$ $0 < TL/f < 1.0;$ $0 < T45/CT5 < 0.57.$

According to another aspect of the present disclosure, an image system lens assembly, includes five lens elements, the five lens elements being, in order from an object side to an image side: a first lens element having an object-side surface being convex in a paraxial region; a second lens element with negative refractive power having an object side-surface being convex in a paraxial region thereof; a third lens element; a fourth lens element having positive refractive power; and a fifth lens element, wherein an axial distance between an image-side surface of the fifth lens element and an image surface is BL, an axial distance between the first lens element and the second lens element is T12, an axial distance between the second lens element and the third lens element is T23, an axial distance between the third lens element and the fourth lens element is T34, an axial distance between the object-side surface of the first lens element and the image surface is TL, a focal length of the image system lens assembly is f, a central thickness of the first lens element is CT1, and the following conditions are satisfied:

$0.10 < BL/T23 < 1.20;$ $0.65 < T23/T34 < 5.8;$ $0 < TL/f < 1.0;$ $0 < T12/CT1 < 0.43.$

According to another aspect of the present disclosure, an imaging apparatus includes the aforementioned image system lens assembly and an image sensor disposed on an image surface of the image system lens assembly.

According to another aspect of the present disclosure, an electronic device includes the aforementioned imaging apparatus.

DETAILED DESCRIPTION

Figure 1A:
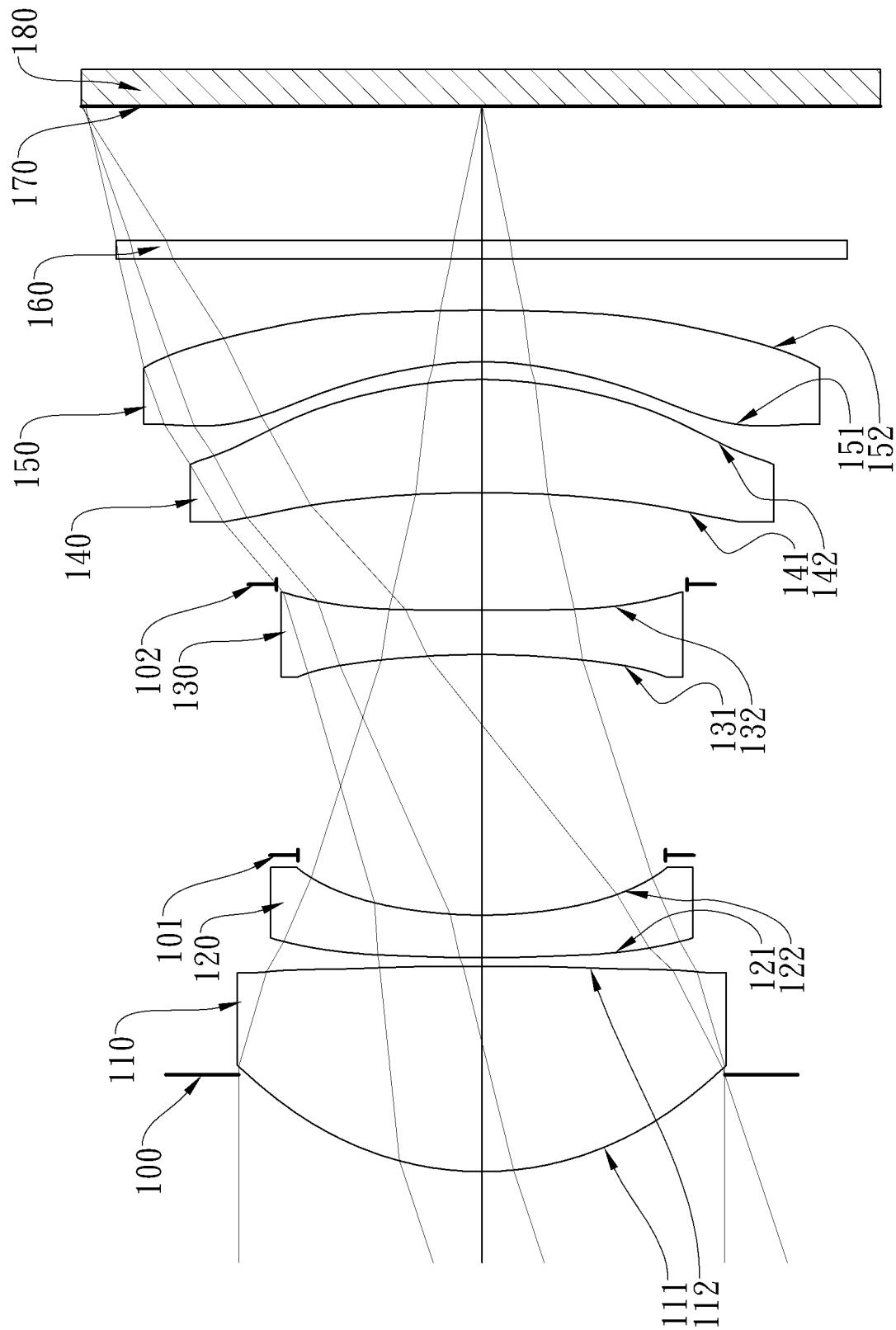
FIG. 1A is a schematic view of an imaging apparatus according to the 1st embodiment of the present disclosure.

The present disclosure provides an image system lens assembly including five lens elements, the five lens elements being, in order from an object side to an image side, a first lens element, a second lens element, a third lens element, a fourth lens element, and a fifth lens element.

The first lens element may have positive refractive power so as to favorably reduce a total track length. The first lens element may have an object-side surface being convex in a paraxial region thereof so as to make the image system lens assembly suitably designed for large aperture.

The second lens element may have negative refractive power so as to balance spherical aberrations and chromatic aberrations resulted from the first lens element. The second lens element has an object-side surface being convex in a paraxial region thereof such that a principal point can be shifted toward the object side to better exhibit telephoto functions.

The third lens element may have negative refractive power such that the refractive power in the front end and in the back end of the image system lens assembly can be balanced so as to reduce an outer diameter.

The fourth lens element has positive refractive power such that positive refractive power of the image system lens assembly can be well distributed and aberrations resulted from a reduced total track length can be reduced thereby so as to obtain an increased sharpness of images. The fourth lens element may have an image-side surface being convex in a paraxial region thereof so as to reduce surface reflections of light in a peripheral region to increase illuminations on an image surface.

The fifth lens element may have negative refractive power to adjust Petzval sum to reduce occurrences of astigmatisms and field curvatures. The fifth lens element may have at least one inflection point on at least one of an object-side surface and an image-side surface thereof to favorably correct aberrations and reduce the volume of the image system lens assembly.

Any two adjacent lens elements of the first lens element, the second lens element, the third lens element, the fourth lens element, and the fifth lens element may have an air gap on an optical axis, which means the image system lens assembly may have five non-cemented single lens elements. A cementing process of lens elements is more complicated than a non-cementing process, particularly when the two surfaces to be cemented are required to have highly precise curvatures to achieve a highly fitted cemented lens element. Also, during the cementing process, misalignments may also result a poorly cemented lens element and affect overall optical imaging qualities. Therefore, in the present disclosure, any two adjacent lens elements may have an air gap on the optical axis in order to avoid the problems from the lens cementation.

The image system lens assembly may further include an aperture stop. The aperture stop may be disposed at an object side of the second lens element to make the image system lens assembly applicable in small angle of view. Preferably, the aperture stop may be disposed at an object side of the first lens element.

When an axial distance between the image-side surface of the fifth lens element and the image surface is BL, an axial distance between the second lens element and the third lens element is T23, and the following condition can be satisfied: $0.10 < BL/T23 < 1.20$, the ratio between the spacing among the lens elements and a back focal length can be adjusted for reducing the volume. Preferably, the following condition can be satisfied: $0.30 < BL/T23 < 1.0$.

When the axial distance between the second lens element and the third lens element is T23, an axial distance between the third lens element and the fourth lens element is T34, and the following condition can be satisfied: $0.10 < T23/T34 < 7.5$, the spacing between the lens elements can be properly arranged in order to adjust an optical path such that the image system lens assembly can better exhibit small angle and telephoto properties of a lens unit while maintaining the volume thereof. Preferably, the following condition can be satisfied: 0.10<T23/T34<5.8. Preferably, the following condition can be satisfied: 0.65<T23/T34<5.8. Preferably, the following condition can be satisfied: 1.1<T23/T34<3.5. Preferably, the following condition can be satisfied: 1.1<T23/T34<2.8.

When an axial distance between the object-side surface of the first lens element and the image surface is TL, a focal length of the image system lens assembly is f, and the following condition can be satisfied: 0<TL/f<1.0, the image system lens assembly can achieve a balance between reducing the total track length and maintaining the angle of view thereof.

When an axial distance between the fourth lens element and the fifth lens element is T45, a central thickness of the fifth lens element is CT5, and the following condition can be satisfied: 0<T45/CT5<0.57, the fourth lens element and the fifth lens element can cooperate with each other for correcting off-axis aberrations.

When an axial distance between the first lens element and the second lens element is T12, a central thickness of the first lens element is CT1, and the following condition can be satisfied: 0<T12/CT1<0.43, the first lens element and the second lens element can function complementarily for reducing occurrences of spherical aberrations and chromatic aberrations. Preferably, the following condition can be satisfied: 0<T12/CT1<0.27.

When an axial distance between the object-side surface of the first lens element and the image-side surface of the fifth lens element is TD, the axial distance between the second lens element and the third lens element is T23, and the following condition can be satisfied: 1.5<TD/T23<5.0, the spacing between the lens elements can be adjusted for reducing the total track length. Preferably, the following condition can be satisfied: 1.8<TD/T23<4.0.

When the axial distance between the object-side surface of the first lens element and the image surface is TL, a maximum image height of the image system lens assembly is ImgH, and the following condition can satisfied: 2.0<TL/ImgH<3.7, balances between reducing the total track length and increasing the area of the image surface can be achieved.

When an Abbe number of the fourth lens element is V4, and the following conditions can be satisfied: V4<40, chromatic aberrations resulted from the image system lens assembly can be reduced.

When a curvature radius of the object-side surface of the second lens element is R3, a curvature radius of an image-side surface of the second lens element is R4, and the following condition can be satisfied: 0<(R3−R4)/(R3+R4), shape of the second lens element can be configured for correcting aberrations resulted from the first lens element. Preferably, the following condition can be satisfied: 0<(R3−R4)/(R3+R4)<1.0.

When the focal length of the image system lens assembly is f, the maximum image height of the image system lens assembly is ImgH, and the following condition can be satisfied: 2.0<f/ImgH<4.2, balances between providing telephoto functions and increasing the area of the image surface can be obtained.

When an f-number of the image system lens assembly is Fno, and the following condition can be satisfied: 2.0<Fno<2.8, sufficient and appropriate illuminations on the image surface can be obtained.

When an axial distance between the aperture stop and the image surface is SL, the axial distance between the object-side surface of the first lens element and the image surface is TL, and the following condition can be satisfied: 0.80<SL/TL<1.0, the position of the aperture stop can be adjusted for achieving a balance between reducing angle of view and compressing the volume of the image system lens assembly. Preferably, the following condition can be satisfied: 0.87<SL/TL<0.95.

When an Abbe number of the first lens element is V1, an Abbe number of the second lens element is V2, the Abbe number of the fourth lens element is V4, and the following condition can be satisfied: 0.20<(V2+V4)/V1<1.0, chromatic aberrations can be corrected and the image system lens assembly can better exhibit telephoto functions.

When the axial distance between the object-side surface of the first lens element and the image surface is TL, and the following condition can be satisfied: TL<6.5 mm, the total track length can be effectively reduced.

When half of a maximal field of view of the image system lens assembly is HFOV, and the following condition can be satisfied: 10°<HFOV<28°, the view angle can be maintained within a specific range for better exhibiting telephoto functions.

When the axial distance between the object-side surface of the first lens element and the image surface is TL, the axial distance between the image-side surface of the fifth lens element and the image surface is BL, and the following condition can be satisfied: 4.8<TL/BL<10, the configuration of the lens elements can be suitably adjusted for achieving a balance between reducing the total track length and maintaining the view angle.

When a distance in parallel with the optical axis from a center of the object-side surface of the first lens element to a maximum effective diameter position on the object-side surface of the first lens element is Sag11, a focal length of the first lens element is f1, and the following condition can be satisfied: 0.15<|Sag11/f1|<0.30, the shape and the focal length of the first lens element can be adjusted so as to maintain the view angle, better exhibiting telephoto functions and favorably increase an aperture.

When a curvature radius of the object-side surface of the fifth lens element is R9, a curvature radius of the image-side surface of the fifth lens element is R10, and the following condition can be satisfied: (R9+R10)/(R9−R10)<0, the shape of the fifth lens element can be adjusted for correcting field curvature resulted from the image system lens assembly. Preferably, the following condition can be satisfied:

$$-10.0<(R9+R10)/(R9-R10)\leq-1.0.$$

When a focal length of the second lens element is f2, a focal length of the fifth lens element is f5, and the following condition can be satisfied: 0.80<|f2/f5|<3.0, the refractive power can be properly distributed for reducing astigmatisms.

When the focal length of the image system lens assembly is f, the focal length of the first lens element is f1, and the following condition can be satisfied: 1.5<f/f1<3.5, the refractive power of the first lens element can be adjusted for reducing the total track length and reducing spherical aberrations.

When the focal length of the image system lens assembly is f, a curvature radius of the object-side surface of the first lens element is R1, and the following condition can be satisfied: 3.0<f/R1<5.0, the shape of the first lens element and the focal length of the image system lens assembly can be favorably adjusted for maintaining the view angle and reducing the total track length.

When the focal length of the image system lens assembly is f, a focal length of the third lens element is f3, and the following condition can be satisfied: −2.50<f/f3≤−0.60, the third lens element can have appropriate negative refractive power for balancing aberrations resulted from reducing the volume.

When a vertical distance between a maximum effective diameter position on the object-side surface of the first lens element and an optical axis is Y11, a vertical distance between a maximum effective diameter position on the image-side surface of the fifth lens element and the optical axis is Y52, and the following condition can be satisfied: 1.0<Y52/Y11<1.8, the outer diameter and an optical path can be favorably controlled for exhibiting the property of a small angle telephoto lens unit and reducing the volume.

According to the image system lens assembly of the present disclosure, the definition of the inflection point is a transition point where curvature centers along the curve of the lens element surface from the optical axis to a peripheral region transit from an object side to an image side (or from an image side to an object side).

According to the image system lens assembly of the present disclosure, the lens elements thereof can be made of glass or plastic material. When the lens elements are made of glass material, the distribution of the refractive power of the image system lens assembly may be more flexible to design. When the lens elements are made of plastic material, the manufacturing cost can be effectively reduced. Furthermore, surfaces of each lens element can be arranged to be aspheric (ASP). Since these aspheric surfaces can be easily formed into shapes other than spherical shapes so as to have more controllable variables for eliminating aberrations and to further decrease the required quantity of lens elements, the total track length of the image system lens assembly can be effectively reduced.

According to the image system lens assembly of the present disclosure, the image system lens assembly can include at least one stop, such as an aperture stop, a glare stop or a field stop, so as to favorably reduce the amount of stray light and thereby improving the image quality.

According to the image system lens assembly of the present disclosure, the aperture stop can be configured as a front stop or a middle stop. The front stop disposed between an imaged object and the first lens element can provide a longer distance between the exit pupil and the image surface so that there is a telecentric effect for improving the image-sensing efficiency of an image sensor, such as a CCD or CMOS sensor. The middle stop disposed between the first lens element and the image surface is favorable for enlarging the field of view, thereby providing the image system lens assembly with the advantage of a wide-angle lens.

According to the image system lens assembly of the present disclosure, when the lens element has a convex surface and the region of convex shape is not defined, it indicates that the surface can be convex in the paraxial region thereof. When the lens element has a concave surface and the region of concave shape is not defined, it indicates that the surface can be concave in the paraxial region thereof. Likewise, when the region of refractive power or focal length of a lens element is not defined, it indicates that the region of refractive power or focal length of the lens element can be in the paraxial region thereof.

According to the image system lens assembly of the present disclosure, the image surface of the image system lens assembly, based on the corresponding image sensor, can be a plane or a curved surface with an arbitrary curvature, especially a curved surface being concave facing towards the object side. Meanwhile, the image system lens assembly of the present disclosure may optionally include one or more image correction components (such as a field flattener) between the image surface and the most nearing lens element to the image surface so as to achieve the effect of image correction (such as the field curvature). The optical properties of the image correction components such as curvatures, thicknesses, indices, positions and shapes (convex or concave, spherical or aspheric, diffractive surface and Fresnel surface, etc.) can be adjusted according to the requirement of the imaging apparatus. In general, a preferred image correction component may be a thin plano-concave component having a surface being concave toward the object side and be arranged near to the image surface.

According to the above descriptions of the present disclosure, the following 1st-12th specific embodiments are provided for further explanation.

1st Embodiment

Figure 1B:
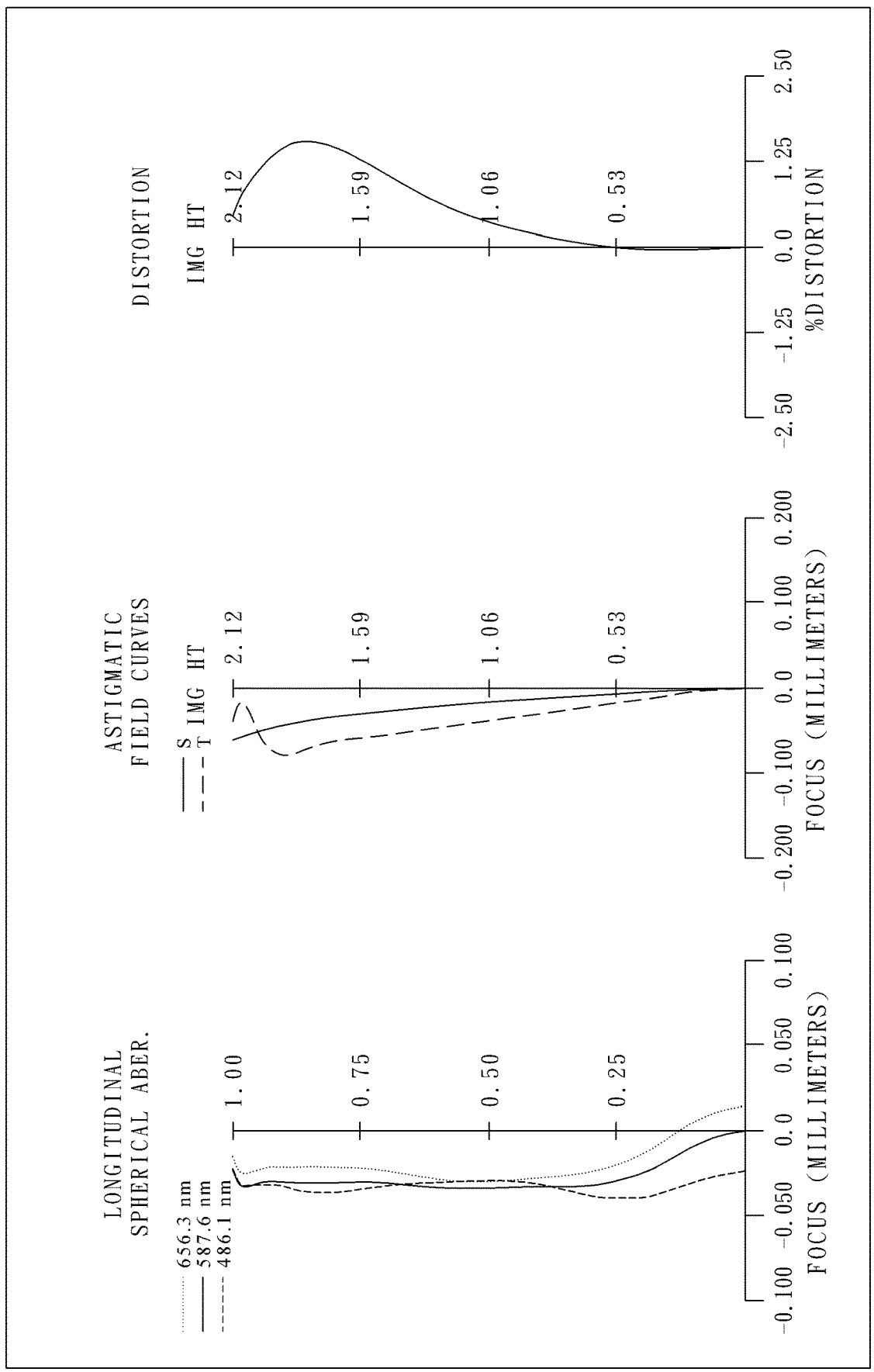
FIG. 1B shows longitudinal spherical aberration curves, astigmatic field curves and a distortion curve of the imaging apparatus according to the 1st embodiment.

FIG. 1A is a schematic view of an imaging apparatus according to the 1st embodiment of the present disclosure. FIG. 1B shows, in order from left to right, longitudinal spherical aberration curves, astigmatic field curves and a distortion curve of the imaging apparatus according to the 1st embodiment.

In FIG. 1A, the imaging apparatus includes an image system lens assembly (not otherwise herein labeled) of the present disclosure and an image sensor 180. The image system lens assembly includes five lens elements, the five lens elements being, in order from an object side to an image side, a first lens element 110, a second lens element 120, a third lens element 130, a fourth lens element 140, and a fifth lens element 150. Any two adjacent lens elements of the first lens element 110, the second lens element 120, the third lens element 130, the fourth lens element 140, and the fifth lens element 150 have an air gap on an optical axis there between and no other lens elements are inserted there between.

The first lens element 110 with positive refractive power has an object-side surface 111 being convex in a paraxial region thereof, an image-side surface 112 being concave in a paraxial region thereof, and both the object-side surface 111 and the image-side surface 112 being aspheric. The first lens element 110 is made of plastic material.

The second lens element 120 with negative refractive power has an object-side surface 121 being convex in a paraxial region thereof, an image-side surface 122 being concave in a paraxial region thereof, and both the object-side surface 121 and the image-side surface 122 being aspheric. The second lens element 120 is made of plastic material.

The third lens element 130 with negative refractive power has an object-side surface 131 being concave in a paraxial region thereof, an image-side surface 132 being concave in a paraxial region thereof, and both the object-side surface 131 and the image-side surface 132 being aspheric. The third lens element 130 is made of plastic material.

The fourth lens element 140 with positive refractive power has an object-side surface 141 being concave in a paraxial region thereof, an image-side surface 142 being convex in a paraxial region thereof, and both the object-side surface 141 and the image-side surface 142 being aspheric. The fourth lens element 140 is made of plastic material.

The fifth lens element 150 with negative refractive power has an object-side surface 151 being concave in a paraxial region thereof, an image-side surface 152 being convex in a paraxial region thereof, both the object-side surface 151 and the image-side surface 152 being aspheric, and at least one inflection point on the object-side surface 151 thereof. The fifth lens element 150 is made of plastic material.

The image system lens assembly further includes an aperture stop 100 disposed at an object side of the first lens element 110, a stop 101 disposed between the second lens element 120 and the third lens element 130, a stop 102 disposed between the third lens element 130 and the fourth lens element 140, and an IR cut filter 160 disposed between the fifth lens element 150 and an image surface 170. The IR cut filter 160 is made of glass material and will not affect a focal length of the image system lens assembly. The image sensor 180 is disposed on or near the image surface 170 of the image system lens assembly.

Figure 11:
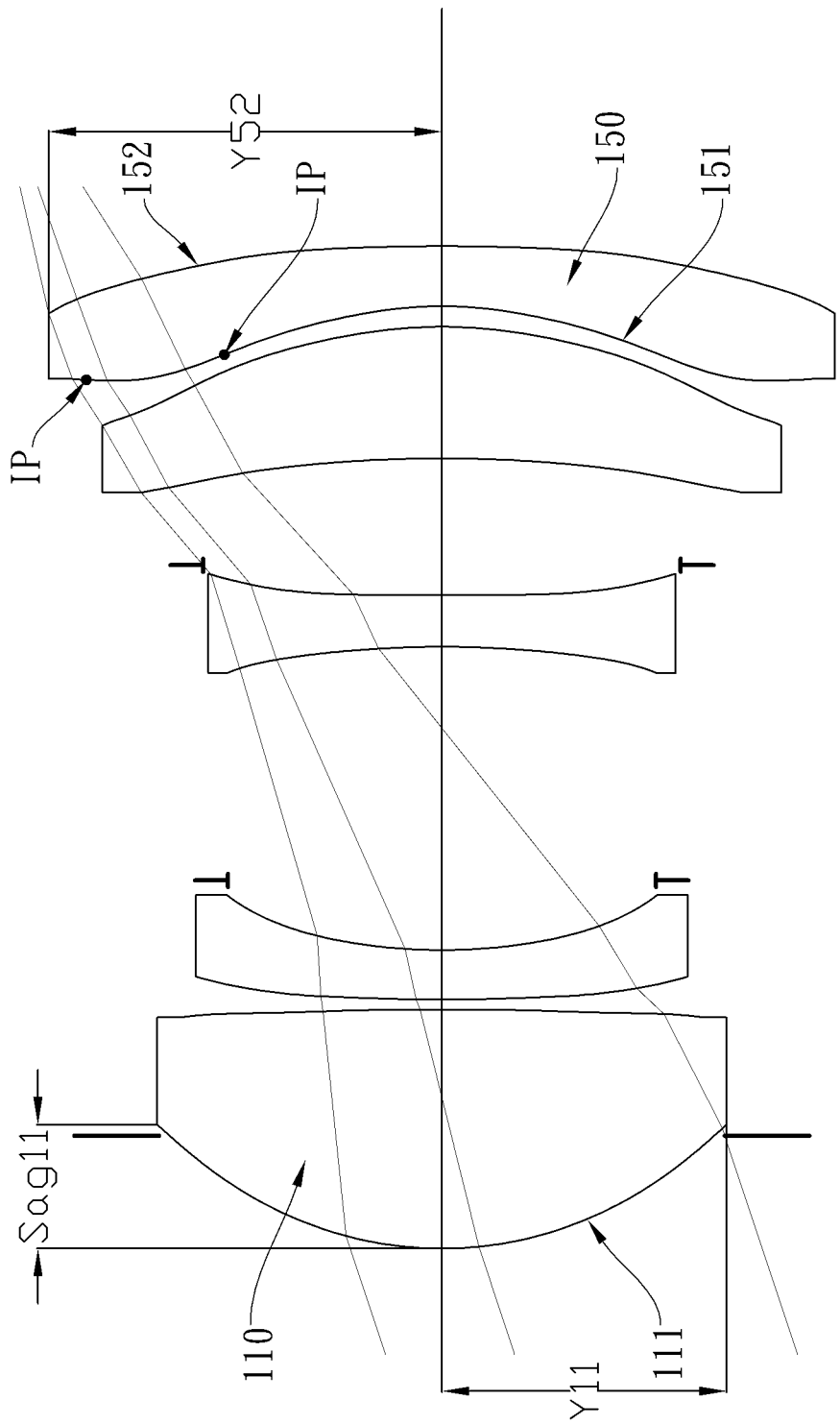
FIG. 11 is a schematic view showing at least one inflection point IP and parameters Y11, Y52, Sag11 of the 1st embodiment of the present disclosure as an example.

Please refer to FIG. 11, which is a schematic view showing the at least one inflection point IP and parameters Y11, Y52, Sag11 of the 1st embodiment of the present disclosure as an example. Please note the definitions of these characters exemplarily shown in FIG. 11 are also applicable to any one of the other embodiments of the present disclosure. The fifth lens element 150 has the at least one inflection point IP in the off-axis region of the object-side surface 151 thereof. A vertical distance between a maximum effective diameter position on the object-side surface 111 of the first lens element 110 and the optical axis is Y11. A vertical distance between a maximum effective diameter position on the image-side surface 152 of the fifth lens element 150 and the optical axis is Y52. A distance in parallel with the optical axis from a center of the object-side surface 111 of the first lens element 110 to a maximum effective diameter position on the object-side surface 111 of the first lens element 110 is Sag11.

The detailed optical data of the 1st embodiment are shown in TABLE 1, and the aspheric surface data are shown in TABLE 2, wherein the units of the curvature radius, the thickness and the focal length are expressed in mm, f is the focal length of the image system lens assembly, Fno is an f-number of the image system lens assembly, and HFOV is half of a maximal field of view, and surfaces #1 to #16 refer to the surfaces in order from the object side to the image side. The aspheric surface data are shown in TABLE 2, wherein k is the conic coefficient in the equation of the aspheric surface profiles, and A4-A16 refer to the 4th to 16th order aspheric coefficients.

Further, it should be noted that the tables shown in each of the following embodiments are associated with the schematic view and diagrams of longitudinal spherical aberration curves, astigmatic field curves and a distortion curve for the respective embodiment. Also, the definitions of the parameters presented in later tables are the same as those of the parameters presented in TABLE 1 and TABLE 2 for the 1st embodiment. Explanations in this regard will not be provided again.

TABLE 1

(1st Embodiment)
f = 6.38 mm, Fno = 2.47, HFOV = 18.4 deg.

| Surface # | | Curvature Radius | Thickness | Material | Index | Abbe # | Focal Length |
|---|---|---|---|---|---|---|---|
| 0 | Object | Planar | Infinity | | | | |
| 1 | Ape. Stop | Planar | −0.516 | | | | |
| 2 | Lens 1 | 1.684 ASP | 1.091 | Plastic | 1.545 | 56.0 | 3.13 |
| 3 | | 107.065 ASP | 0.046 | | | | |
| 4 | Lens 2 | 5.809 ASP | 0.227 | Plastic | 1.669 | 19.5 | −6.57 |
| 5 | | 2.462 ASP | 0.319 | | | | |
| 6 | Stop | Planar | 1.067 | | | | |
| 7 | Lens 3 | −5.095 ASP | 0.236 | Plastic | 1.544 | 56.0 | −8.53 |
| 8 | | 53.063 ASP | 0.137 | | | | |
| 9 | Stop | Planar | 0.488 | | | | |
| 10 | Lens 4 | −7.493 ASP | 0.602 | Plastic | 1.639 | 23.2 | 4.42 |
| 11 | | −2.116 ASP | 0.095 | | | | |
| 12 | Lens 5 | −1.669 ASP | 0.273 | Plastic | 1.544 | 56.0 | −3.70 |
| 13 | | −10.294 ASP | 0.273 | | | | |
| 14 | IR Cut Filter | Planar | 0.100 | Glass | 1.517 | 64.2 | — |
| 15 | | Planar | 0.713 | | | | |
| 16 | Image Surface | Planar | — | | | | |

\* Reference wavelength is d-line 587.6 nm.
\* The effective radius of Surface 6 is 0.977 mm.
\* The effective radius of Surface 9 is 1.091 mm.

TABLE 2

Aspheric Coefficients

| Surface # | 2 | 3 | 4 | 5 | 7 |
|---|---|---|---|---|---|
| k = | −3.9371E−01 | 9.0000E+01 | −6.1725E+01 | −3.6021E+01 | 2.7030E+00 |
| A4 = | 5.3830E−03 | −2.0639E−01 | −2.1199E−01 | 2.0374E−01 | −1.3422E−02 |
| A6 = | 1.8931E−03 | 5.0849E−01 | 6.0932E−01 | −2.4662E−01 | 6.8121E−02 |
| A8 = | −5.5091E−03 | −5.6970E−01 | −6.7509E−01 | 4.8327E−01 | −9.4715E−02 |
| A10 = | 6.8651E−03 | 3.3817E−01 | 3.9412E−01 | −4.8731E−01 | 2.4737E−03 |
| A12 = | −2.8352E−03 | −1.0971E−01 | −1.2903E−01 | 2.0199E−01 | 2.4196E−02 |
| A14 = | | 1.5784E−02 | 2.2448E−02 | | −1.4009E−02 |

| Surface # | 8 | 10 | 11 | 12 | 13 |
|---|---|---|---|---|---|
| k = | −1.8823E+01 | 1.4525E+01 | −8.4477E−01 | −8.1576E+00 | −2.1599E+01 |
| A4 = | 2.5370E−02 | −5.1760E−02 | 9.8341E−02 | 8.4098E−02 | 5.2207E−02 |

TABLE 2-continued

Aspheric Coefficients

| A6 = | 1.6786E−01 | 1.2400E−01 | −7.8576E−02 | −2.3861E−01 | −1.9626E−01 |
|---|---|---|---|---|---|
| A8 = | −2.3999E−01 | −1.3558E−01 | −8.5517E−03 | 1.7792E−01 | 2.0466E−01 |
| A10 = | 1.9361E−01 | 5.4087E−02 | 2.5307E−02 | −3.4201E−02 | −1.0766E−01 |
| A12 = | −9.8285E−02 | 2.1568E−03 | −5.1993E−03 | −1.0981E−02 | 3.1089E−02 |
| A14 = | 2.1578E−02 | −3.8631E−03 | −1.9517E−04 | 5.3382E−03 | −4.7085E−03 |
| A16 = | | | | −6.0419E−04 | 2.9036E−04 |

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

where:

X is the relative distance between a point on the aspheric surface spaced at a distance Y from the optical axis and the tangential plane at the aspheric surface vertex on the optical axis;

Y is the vertical distance from the point on the aspheric surface profile to the optical axis;

R is the curvature radius;

k is the conic coefficient; and

Ai is the i-th aspheric coefficient.

In the 1st embodiment, the focal length of the image system lens assembly is f, the f-number of the image system lens assembly is Fno, half of the maximal field of view of the image system lens assembly is HFOV, and these parameters have the following values: f=6.38 mm; Fno=2.47; and HFOV=18.4 degrees.

In the 1st embodiment, an Abbe number of the first lens element 110 is V1, an Abbe number of the second lens element 120 is V2, an Abbe number of the fourth lens element 140 is V4, and they satisfy the condition: (V2+V4)/V1=0.76.

In the 1st embodiment, the Abbe number of the fourth lens element 140 is V4, and it satisfies the condition: V4=23.2.

In the 1st embodiment, an axial distance between the image-side surface 152 of the fifth lens element 150 and the image surface 170 is BL, an axial distance between the second lens element 120 and the third lens element 130 is T23, and they satisfy the condition: BL/T23=0.78.

In the 1st embodiment, an axial distance between the aperture stop 100 and the image surface 170 is SL, an axial distance between the object-side surface 111 of the first lens element 110 and the image surface 170 is TL, and they satisfy the condition: SL/TL=0.91.

In the 1st embodiment, an axial distance between the first lens element 110 and the second lens element 120 is T12, a central thickness of the first lens element 110 is CT1, and they satisfy the condition: T12/CT1=0.04.

In the 1st embodiment, the axial distance between the second lens element 120 and the third lens element 130 is T23, an axial distance between the third lens element 130 and the fourth lens element 140 is T34, and they satisfy the condition: T23/T34=2.22.

In the 1st embodiment, an axial distance between the fourth lens element 140 and the fifth lens element 150 is T45, a central thickness of the fifth lens element 150 is CT5, and they satisfy the condition: T45/CT5=0.35.

In the 1st embodiment, an axial distance between the object-side surface 111 of the first lens element 110 and the image-side surface 152 of the fifth lens element 150 is TD, the axial distance between the second lens element 120 and the third lens element 130 is T23, and they satisfy the condition: TD/T23=3.31.

In the 1st embodiment, the axial distance between the object-side surface 111 of the first lens element 110 and the image surface 170 is TL, and it satisfies the condition: TL=5.67 mm.

In the 1st embodiment, the axial distance between the object-side surface 111 of the first lens element 110 and the image surface 170 is TL, the axial distance between the image-side surface 152 of the fifth lens element 150 and the image surface 170 is BL, and they satisfy the condition: TL/BL=5.22.

In the 1st embodiment, the axial distance between the object-side surface 111 of the first lens element 110 and the image surface 170 is TL, the focal length of the image system lens assembly is f, and they satisfy the condition: TL/f=0.89.

In the 1st embodiment, the axial distance between the object-side surface 111 of the first lens element 110 and the image surface 170 is TL, a maximum image height of the image system lens assembly is ImgH, and they satisfy the condition: TL/ImgH=2.68.

In the 1st embodiment, a curvature radius of the object-side surface 121 of the second lens element 120 is R3, a curvature radius of the image-side surface 122 of the second lens element 120 is R4, and they satisfy the condition: (R3−R4)/(R3+R4)=0.40.

In the 1st embodiment, a curvature radius of the object-side surface 151 of the fifth lens element 150 is R9, a curvature radius of the image-side surface 152 of the fifth lens element 150 is R10, and they satisfy the condition: (R9+R10)/(R9−R10)=−1.39.

In the 1st embodiment, the focal length of the image system lens assembly is f, a focal length of the first lens element 110 is f1, and they satisfy the condition: f/f1=2.04.

In the 1st embodiment, the focal length of the image system lens assembly is f, a focal length of the third lens element 130 is f3, and they satisfy the condition: f/f3=−0.75.

In the 1st embodiment, the focal length of the image system lens assembly is f, the maximum image height of the image system lens assembly is ImgH, and they satisfy the condition: f/ImgH=3.01.

In the 1st embodiment, the focal length of the image system lens assembly is f, a curvature radius of the object-side surface 111 of the first lens element 110 is R1, and they satisfy the condition: f/R1=3.79.

In the 1st embodiment, a focal length of the second lens element 120 is f2, a focal length of the fifth lens element 150 is f5, and they satisfy the condition: |f2/f5|=1.77.

In the 1st embodiment, the distance in parallel with the optical axis from the center of the object-side surface 111 of the first lens element 110 to the maximum effective diameter position on the object-side surface 111 of the first lens element 110 is Sag11, the focal length of the first lens element 110 is f1, and they satisfy the condition: |Sag11/f1|=0.18.

In the 1st embodiment, the vertical distance between the maximum effective diameter position on the object-side surface 111 of the first lens element 110 and the optical axis is Y11, the vertical distance between the maximum effective diameter position on the image-side surface 152 of the fifth lens element 150 and the optical axis is Y52, and they satisfy the condition: Y52/Y11=1.38.

2nd Embodiment

Figure 2A:
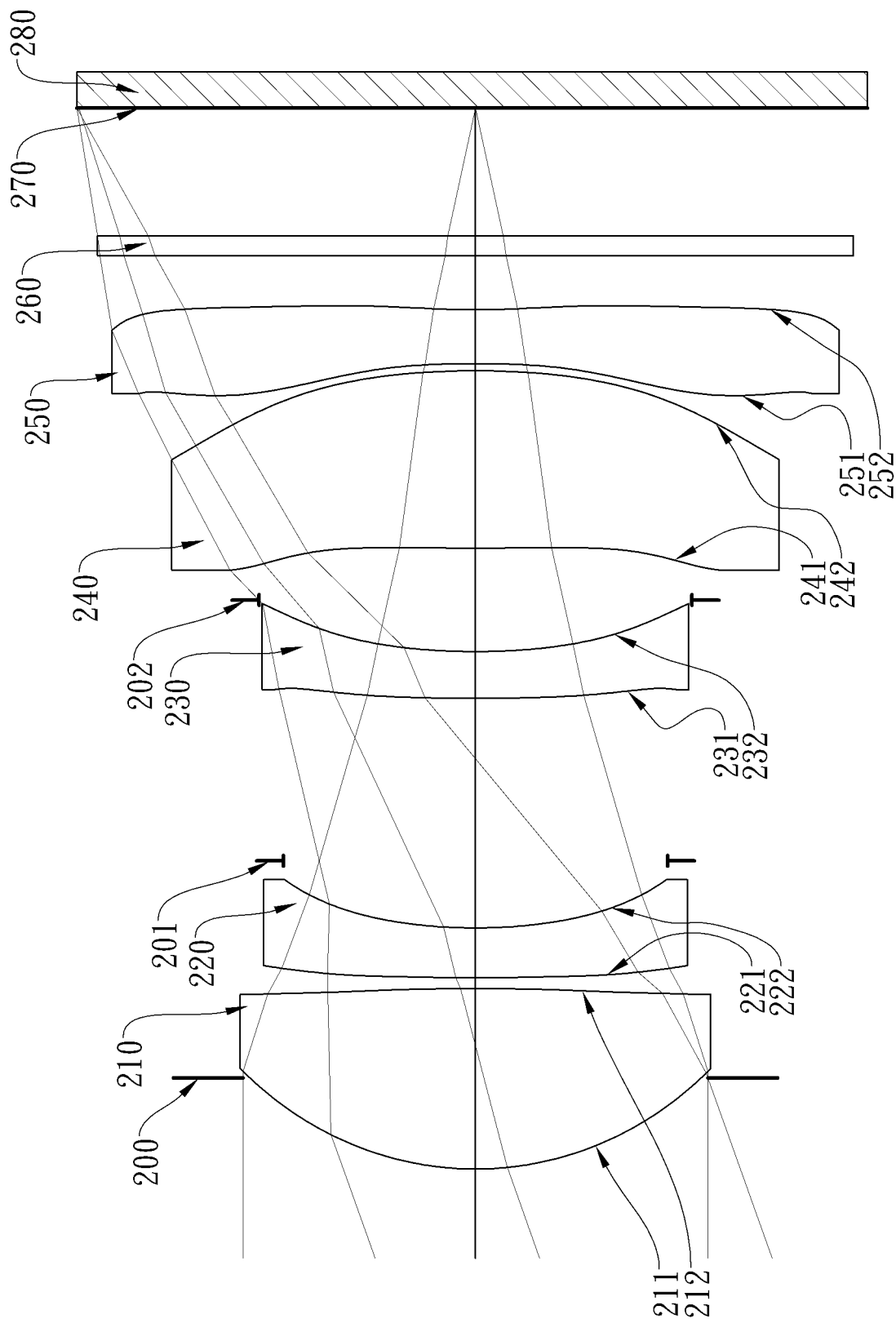
FIG. 2A is a schematic view of an imaging apparatus according to the 2nd embodiment of the present disclosure.
Figure 2B:
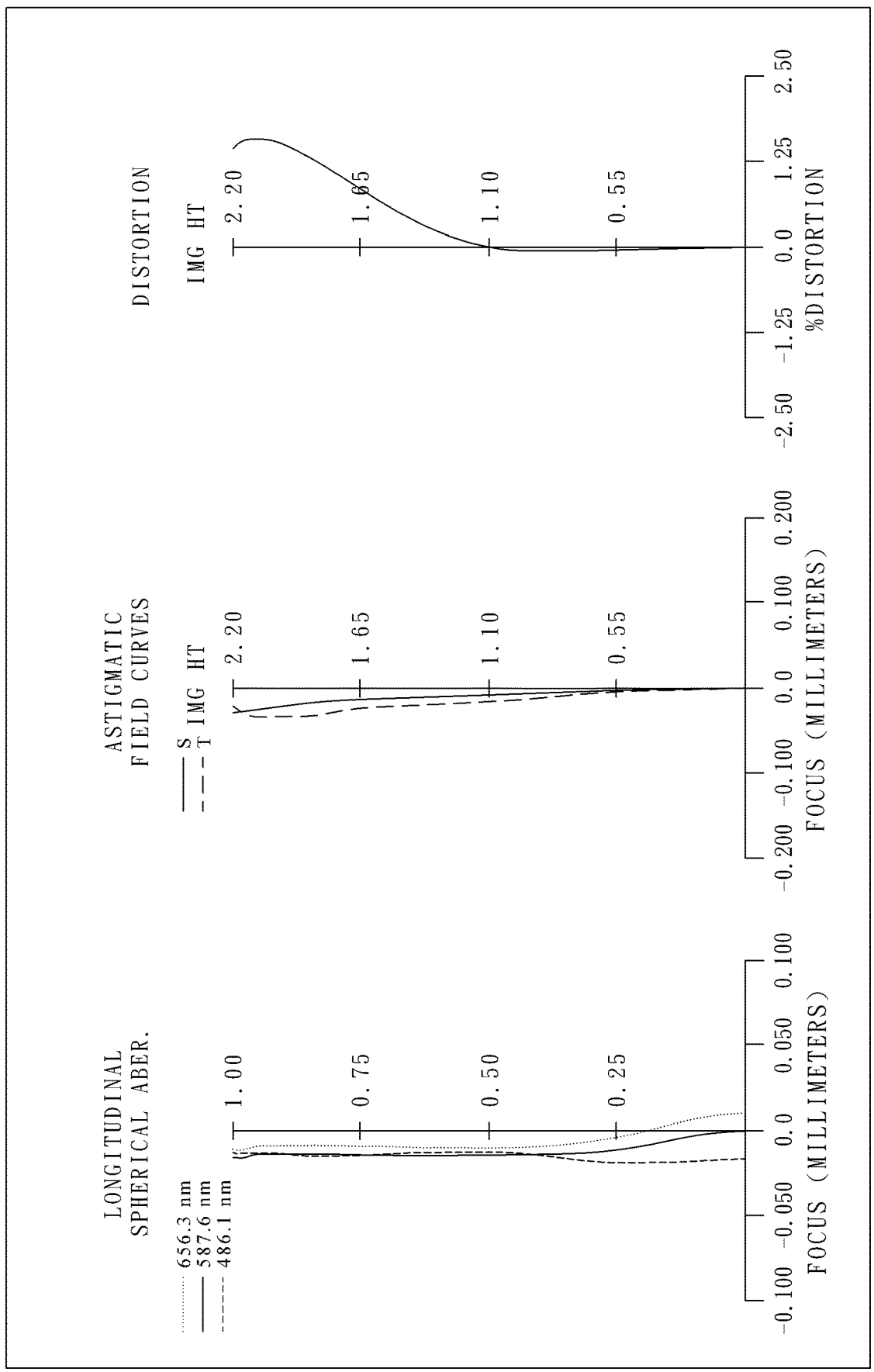
FIG. 2B shows longitudinal spherical aberration curves, astigmatic field curves and a distortion curve of the imaging apparatus according to the 2nd embodiment.

FIG. 2A is a schematic view of an imaging apparatus according to the 2nd embodiment of the present disclosure. FIG. 2B shows, in order from left to right, longitudinal spherical aberration curves, astigmatic field curves and a distortion curve of the imaging apparatus according to the 2nd embodiment.

In FIG. 2A, the imaging apparatus includes an image system lens assembly (not otherwise herein labeled) of the present disclosure and an image sensor 280. The image system lens assembly includes five lens elements, the five lens elements being, in order from an object side to an image side, a first lens element 210, a second lens element 220, a third lens element 230, a fourth lens element 240, and a fifth lens element 250. Any two adjacent lens elements of the first lens element 210, the second lens element 220, the third lens element 230, the fourth lens element 240, and the fifth lens element 250 have an air gap on an optical axis there between and no other lens elements are inserted there between.

The first lens element 210 with positive refractive power has an object-side surface 211 being convex in a paraxial region thereof, an image-side surface 212 being convex in a paraxial region thereof, and both the object-side surface 211 and the image-side surface 212 being aspheric. The first lens element 210 is made of plastic material.

The second lens element 220 with negative refractive power has an object-side surface 221 being convex in a paraxial region thereof, an image-side surface 222 being concave in a paraxial region thereof, and both the object-side surface 221 and the image-side surface 222 being aspheric. The second lens element 220 is made of plastic material.

The third lens element 230 with negative refractive power has an object-side surface 231 being convex in a paraxial region thereof, an image-side surface 232 being concave in a paraxial region thereof, and both the object-side surface 231 and the image-side surface 232 being aspheric. The third lens element 230 is made of plastic material.

The fourth lens element 240 with positive refractive power has an object-side surface 241 being convex in a paraxial region thereof, an image-side surface 242 being convex in a paraxial region thereof, and both the object-side surface 241 and the image-side surface 242 being aspheric. The fourth lens element 240 is made of plastic material.

The fifth lens element 250 with negative refractive power has an object-side surface 251 being concave in a paraxial region thereof, an image-side surface 252 being concave in a paraxial region thereof, both the object-side surface 251 and the image-side surface 252 being aspheric, and at least one inflection point on both the object-side surface 251 and the image-side surface 252 thereof. The fifth lens element 250 is made of plastic material.

The image system lens assembly further includes an aperture stop 200 disposed at an object side of the first lens element 210, a stop 201 disposed between the second lens element 220 and the third lens element 230, a stop 202 disposed between the third lens element 230 and the fourth lens element 240, and an IR cut filter 260 disposed between the fifth lens element 250 and an image surface 270. The IR cut filter 260 is made of glass material and will not affect a focal length of the image system lens assembly. The image sensor 280 is disposed on or near the image surface 270 of the image system lens assembly.

The detailed optical data of the 2nd embodiment are shown in TABLE 3, and the aspheric surface data are shown in TABLE 4.

TABLE 3

(2nd Embodiment)
f = 6.11 mm, Fno = 2.37, HFOV = 19.6 deg.

| Surface # | | Curvature Radius | Thickness | Material | Index | Abbe # | Focal Length |
|---|---|---|---|---|---|---|---|
| 0 | Object | Planar | Infinity | | | | |
| 1 | Ape. Stop | Planar | −0.505 | | | | |
| 2 | Lens 1 | 1.763 ASP | 1.000 | Plastic | 1.545 | 56.0 | 3.18 |
| 3 | | −74.047 ASP | 0.061 | | | | |
| 4 | Lens 2 | 9.346 ASP | 0.277 | Plastic | 1.639 | 23.5 | −6.61 |
| 5 | | 2.874 ASP | 0.373 | | | | |
| 6 | Stop | Planar | 0.901 | | | | |
| 7 | Lens 3 | 12.886 ASP | 0.260 | Plastic | 1.614 | 26.0 | −8.52 |
| 8 | | 3.691 ASP | 0.286 | | | | |
| 9 | Stop | Planar | 0.288 | | | | |
| 10 | Lens 4 | 20.751 ASP | 0.985 | Plastic | 1.669 | 19.5 | 5.78 |
| 11 | | −4.662 ASP | 0.039 | | | | |
| 12 | Lens 5 | −7.523 ASP | 0.300 | Plastic | 1.582 | 30.2 | −4.82 |
| 13 | | 4.539 ASP | 0.300 | | | | |
| 14 | IR Cut Filter | Planar | 0.110 | Glass | 1.517 | 64.2 | — |
| 15 | | Planar | 0.709 | | | | |
| 16 | Image Surface | Planar | — | | | | |

\* Reference wavelength is d-line 587.6 nm.
\* The effective radius of Surface 6 is 1.065 mm.
\* The effective radius of Surface 9 is 1.200 mm.

TABLE 4

Aspheric Coefficients

| Surface # | 2 | 3 | 4 | 5 | 7 |
|---|---|---|---|---|---|
| k = | −3.5480E−01 | −9.0000E+01 | −3.6112E+01 | −3.4903E+01 | −9.0000E+01 |
| A4 = | 4.4688E−03 | −1.6558E−01 | −1.8265E−01 | 1.5319E−01 | 3.7039E−02 |
| A6 = | −8.1211E−04 | 4.0462E−01 | 5.1808E−01 | −6.6949E−02 | −1.4188E−02 |
| A8 = | 3.2099E−03 | −4.7458E−01 | −6.4958E−01 | 7.9886E−02 | 6.0859E−02 |
| A10 = | −9.7035E−04 | 3.1297E−01 | 4.5412E−01 | −7.8743E−02 | −1.1677E−01 |
| A12 = | 4.6209E−05 | −1.1268E−01 | −1.7535E−01 | 3.4225E−02 | 7.5365E−02 |
| A14 = | | 1.7324E−02 | 2.9697E−02 | | −2.1770E−02 |

| Surface # | 8 | 10 | 11 | 12 | 13 |
|---|---|---|---|---|---|
| k = | −5.4745E+00 | −9.0000E+01 | 3.4021E+00 | 5.7214E+00 | −6.9127E+01 |
| A4 = | 4.9867E−02 | −4.1665E−02 | −3.7809E−02 | −2.0036E−01 | −1.2885E−01 |
| A6 = | 9.8600E−04 | −2.9354E−02 | 1.6838E−02 | 2.4849E−01 | 1.2119E−01 |
| A8 = | 4.3418E−02 | 1.0758E−02 | −1.8403E−02 | −1.5219E−01 | −5.9582E−02 |
| A10 = | −5.2401E−02 | −1.9419E−02 | 1.1949E−02 | 6.2813E−02 | 1.7124E−02 |
| A12 = | 1.5520E−02 | 2.2159E−02 | −3.2542E−03 | −1.7191E−02 | −2.9769E−03 |
| A14 = | −6.8422E−04 | −5.7733E−03 | 3.3009E−04 | 2.7648E−03 | 3.0879E−04 |
| A16 = | | | | −1.9720E−04 | −1.7183E−05 |

In the 2nd embodiment, the equation of the aspheric surface profiles of the aforementioned lens elements is the same as the equation of the 1st embodiment. Also, the definitions of these parameters shown in table below are the same as those stated in the 1st embodiment with corresponding values for the 2nd embodiment, so an explanation in this regard will not be provided again.

Moreover, these parameters can be calculated from TABLE 3 and TABLE 4 and satisfy the conditions stated in table below.

| 2nd Embodiment | | | |
|---|---|---|---|
| f [mm] | 6.11 | TL/BL | 5.26 |
| Fno | 2.37 | TL/f | 0.96 |
| HFOV [deg.] | 19.6 | TL/ImgH | 2.68 |
| (V2 + V4)/V1 | 0.77 | (R3 − R4)/(R3 + R4) | 0.53 |
| V4 | 19.5 | (R9 + R10)/(R9 − R10) | 0.25 |
| BL/T23 | 0.88 | f/f1 | 1.92 |
| SL/TL | 0.91 | f/f3 | −0.72 |
| T12/CT1 | 0.06 | f/ImgH | 2.78 |
| T23/T34 | 2.22 | f/R1 | 3.47 |
| T45/CT5 | 0.13 | |f2/f5| | 1.37 |
| TD/T23 | 3.74 | Sag11/f1 | 0.18 |
| TL [mm] | 5.89 | Y52/Y11 | 1.55 |

3rd Embodiment

Figure 3A:
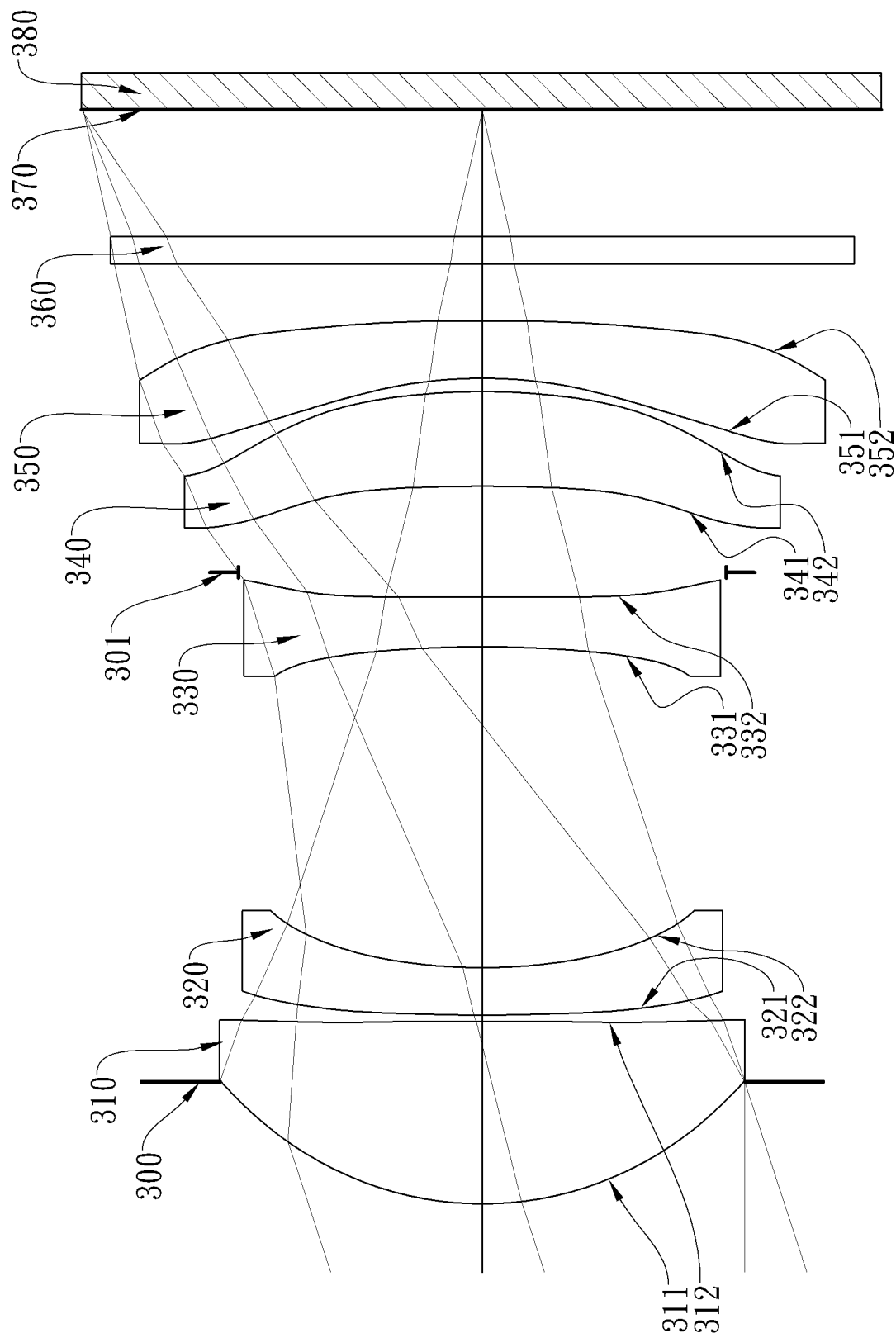
FIG. 3A is a schematic view of an imaging apparatus according to the 3rd embodiment of the present disclosure.
Figure 3B:
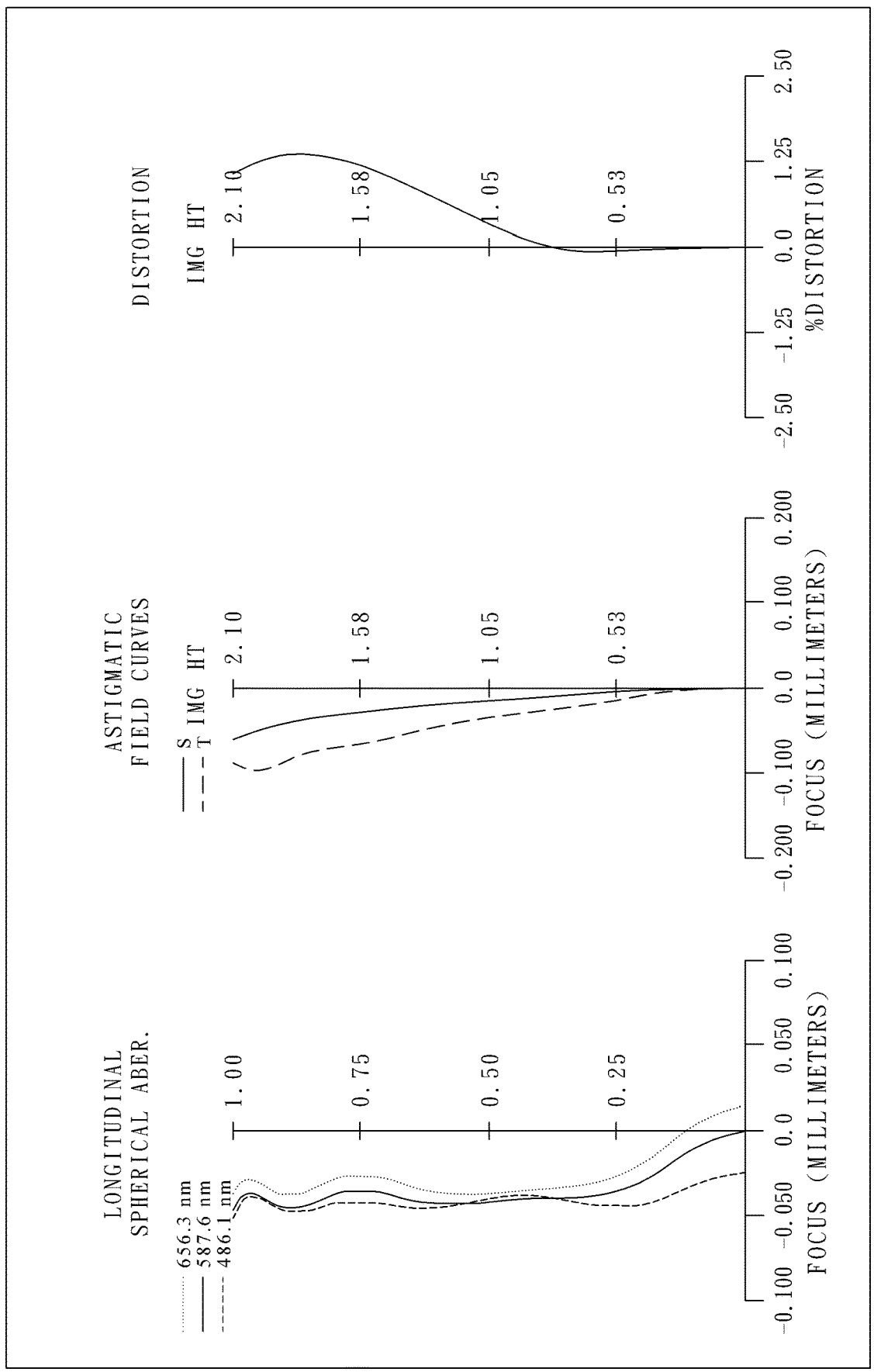
FIG. 3B shows longitudinal spherical aberration curves, astigmatic field curves and a distortion curve of the imaging apparatus according to the 3rd embodiment.

FIG. 3A is a schematic view of an imaging apparatus according to the 3rd embodiment of the present disclosure. FIG. 3B shows, in order from left to right, longitudinal spherical aberration curves, astigmatic field curves and a distortion curve of the imaging apparatus according to the 3rd embodiment.

In FIG. 3A, the imaging apparatus includes an image system lens assembly (not otherwise herein labeled) of the present disclosure and an image sensor 380. The image system lens assembly includes five lens elements, the five lens elements being, in order from an object side to an image side, a first lens element 310, a second lens element 320, a third lens element 330, a fourth lens element 340, and a fifth lens element 350. Any two adjacent lens elements of the first lens element 310, the second lens element 320, the third lens element 330, the fourth lens element 340, and the fifth lens element 350 have an air gap on an optical axis there between and no other lens elements are inserted there between.

The first lens element 310 with positive refractive power has an object-side surface 311 being convex in a paraxial region thereof, an image-side surface 312 being concave in a paraxial region thereof, and both the object-side surface 311 and the image-side surface 312 being aspheric. The first lens element 310 is made of plastic material.

The second lens element 320 with negative refractive power has an object-side surface 321 being convex in a paraxial region thereof, an image-side surface 322 being concave in a paraxial region thereof, and both the object-side surface 321 and the image-side surface 322 being aspheric. The second lens element 320 is made of plastic material.

The third lens element 330 with negative refractive power has an object-side surface 331 being concave in a paraxial region thereof, an image-side surface 332 being convex in a paraxial region thereof, and both the object-side surface 331 and the image-side surface 332 being aspheric. The third lens element 330 is made of plastic material.

The fourth lens element 340 with positive refractive power has an object-side surface 341 being concave in a paraxial region thereof, an image-side surface 342 being convex in a paraxial region thereof, and both the object-side surface 341 and the image-side surface 342 being aspheric. The fourth lens element 340 is made of plastic material.

The fifth lens element 350 with negative refractive power has an object-side surface 351 being concave in a paraxial region thereof, an image-side surface 352 being planar in a paraxial region thereof, both the object-side surface 351 and the image-side surface 352 being aspheric, and at least one inflection point on the object-side surface 351 thereof. The fifth lens element 350 is made of plastic material.

The image system lens assembly further includes an aperture stop 300 disposed at an object side of the first lens element 310, a stop 301 disposed between the third lens element 330 and the fourth lens element 340, and an IR cut filter 360 disposed between the fifth lens element 350 and an image surface 370. The IR cut filter 370 is made of glass material and will not affect the focal length of the image system lens assembly. The image sensor 380 is disposed on or near the image surface 370 of the image system lens assembly.

The detailed optical data of the 3rd embodiment are shown in TABLE 5, and the aspheric surface data are shown in TABLE 6.

TABLE 5

(3rd Embodiment)
f = 6.41 mm, Fno = 2.33, HFOV = 18.1 deg.

| Surface # | | Curvature Radius | | Thickness | Material | Index | Abbe # | Focal Length |
|---|---|---|---|---|---|---|---|---|
| 0 | Object | Planar | | Infinity | | | | |
| 1 | Ape. Stop | Planar | | −0.641 | | | | |
| 2 | Lens 1 | 1.742 | ASP | 0.958 | Plastic | 1.545 | 56.0 | 3.33 |
| 3 | | 36.177 | ASP | 0.033 | | | | |
| 4 | Lens 2 | 6.809 | ASP | 0.250 | Plastic | 1.660 | 20.4 | −7.57 |
| 5 | | 2.841 | ASP | 1.685 | | | | |
| 6 | Lens 3 | −6.477 | ASP | 0.260 | Plastic | 1.559 | 40.4 | −12.33 |
| 7 | | −109.890 | ASP | 0.131 | | | | |
| 8 | Stop | Planar | | 0.452 | | | | |
| 9 | Lens 4 | −9.681 | ASP | 0.498 | Plastic | 1.669 | 19.5 | 7.13 |
| 10 | | −3.261 | ASP | 0.070 | | | | |
| 11 | Lens 5 | −2.495 | ASP | 0.300 | Plastic | 1.544 | 56.0 | −4.59 |
| 12 | | ∞ | ASP | 0.300 | | | | |
| 13 | IR Cut Filter | Planar | | 0.145 | Glass | 1.517 | 64.2 | — |
| 14 | | Planar | | 0.666 | | | | |
| 15 | Image Surface | Planar | | — | | | | |

* Reference wavelength is d-line 587.6 nm.
* The effective radius of Surface 8 is 1.280 mm.

TABLE 6

Aspheric Coefficients

| Surface # | 2 | 3 | 4 | 5 | 6 |
|---|---|---|---|---|---|
| k = | −3.4910E−01 | 9.0000E+01 | −5.8713E+01 | −3.9424E+01 | 2.4605E+01 |
| A4 = | 8.3555E−03 | −1.8743E−01 | −1.9773E−01 | 1.4390E−01 | 2.8624E−02 |
| A6 = | −5.8562E−03 | 4.7511E−01 | 5.8547E−01 | −6.2976E−02 | −1.3561E−01 |
| A8 = | 7.5254E−03 | −5.3429E−01 | −7.0934E−01 | 4.4814E−02 | 2.9672E−01 |
| A10 = | −2.2718E−03 | 3.1551E−01 | 4.5236E−01 | −3.0141E−02 | −3.2748E−01 |
| A12 = | 3.2876E−05 | −9.5894E−02 | −1.4780E−01 | 1.6700E−02 | 1.6393E−01 |
| A14 = | | 1.1904E−02 | 1.9964E−02 | | −3.7212E−02 |

| Surface # | 7 | 9 | 10 | 11 | 12 |
|---|---|---|---|---|---|
| k = | 8.9252E+01 | 3.4350E+01 | 9.6983E−01 | −6.5372E+00 | 0.0000E+00 |
| A4 = | 6.3324E−02 | 3.0661E−02 | 1.1872E−01 | −8.7835E−02 | −1.8694E−01 |
| A6 = | −1.4406E−01 | −2.0017E−01 | −3.5945E−01 | 9.0930E−02 | 3.0568E−01 |
| A8 = | 2.8826E−01 | 1.4776E−01 | 3.7734E−01 | 6.4780E−03 | −2.6388E−01 |
| A10 = | −2.3047E−01 | −2.2681E−02 | −2.1111E−01 | −5.2746E−02 | 1.2984E−01 |
| A12 = | 7.8192E−02 | −7.9904E−03 | 6.2783E−02 | 2.9594E−02 | −3.7870E−02 |
| A14 = | −9.5390E−03 | 2.1517E−03 | −7.5044E−03 | −6.4306E−03 | 6.0746E−03 |
| A16 = | | | | 4.8609E−04 | −4.1053E−04 |

In the 3rd embodiment, the equation of the aspheric surface profiles of the aforementioned lens elements is the same as the equation of the 1st embodiment. Also, the definitions of these parameters shown in table below are the same as those stated in the 1st embodiment with corresponding values for the 3rd embodiment, so an explanation in this regard will not be provided again.

Moreover, these parameters can be calculated from TABLE 5 and TABLE 6 and satisfy the conditions stated in table below.

| 3rd Embodiment | | | |
|---|---|---|---|
| f [mm] | 6.41 | TL/BL | 5.17 |
| Fno | 2.33 | TL/f | 0.90 |
| HFOV [deg.] | 18.1 | TL/ImgH | 2.74 |
| (V2 + V4)/V1 | 0.71 | (R3 − R4)/(R3 + R4) | 0.41 |
| V4 | 19.5 | (R9 + R10)/(R9 − R10) | −1.00 |
| BL/T23 | 0.66 | f/f1 | 1.93 |
| SL/TL | 0.89 | f/f3 | −0.52 |
| T12/CT1 | 0.03 | f/ImgH | 3.05 |
| T23/T34 | 2.89 | f/R1 | 3.68 |
| T45/CT5 | 0.23 | |f2/f5| | 1.65 |
| TD/T23 | 2.75 | |Sag11/f1| | 0.20 |
| TL [mm] | 5.75 | Y52/Y11 | 1.31 |

4th Embodiment

Figure 4A:
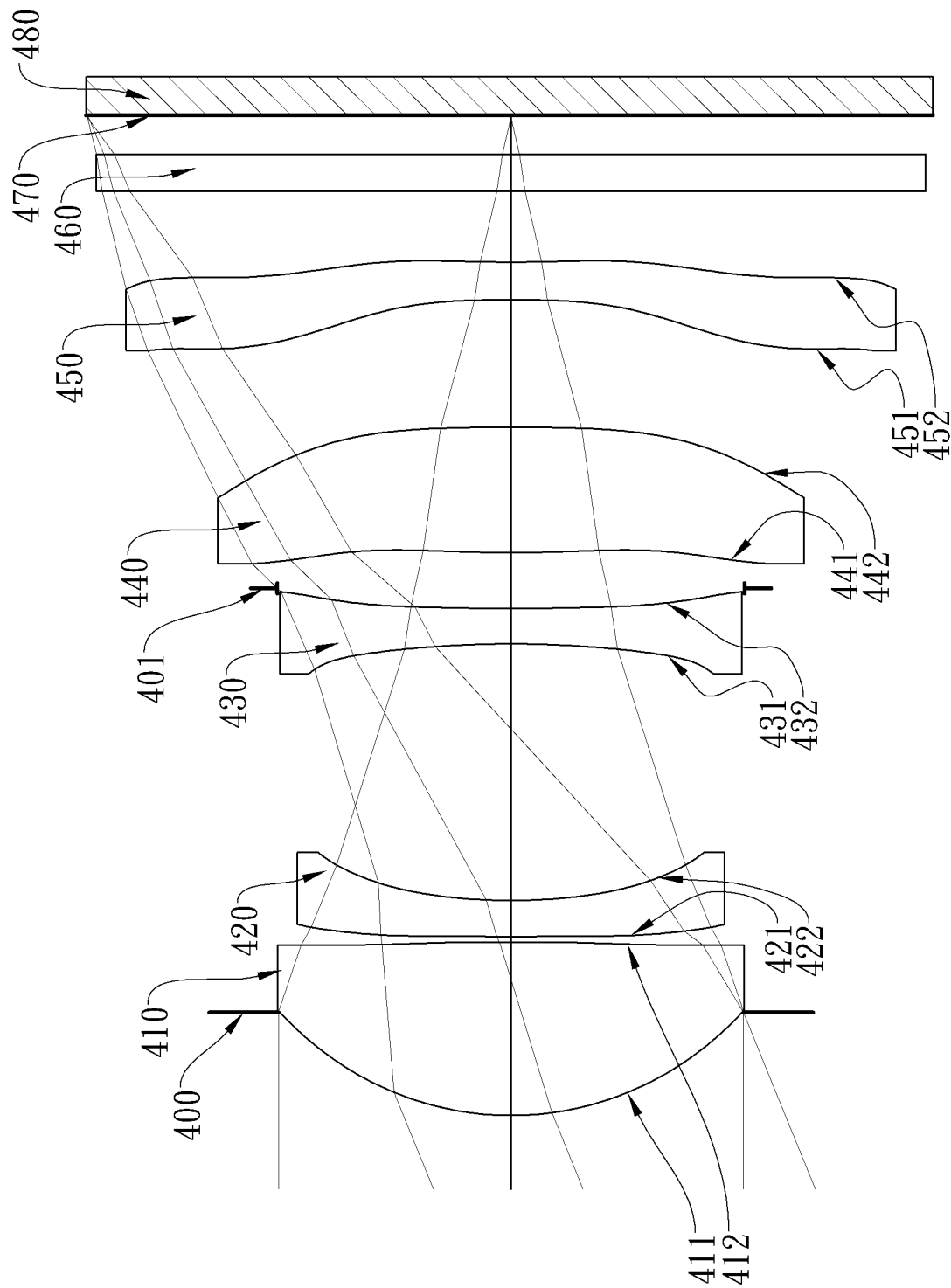
FIG. 4A is a schematic view of an imaging apparatus according to the 4th embodiment of the present disclosure.
Figure 4B:
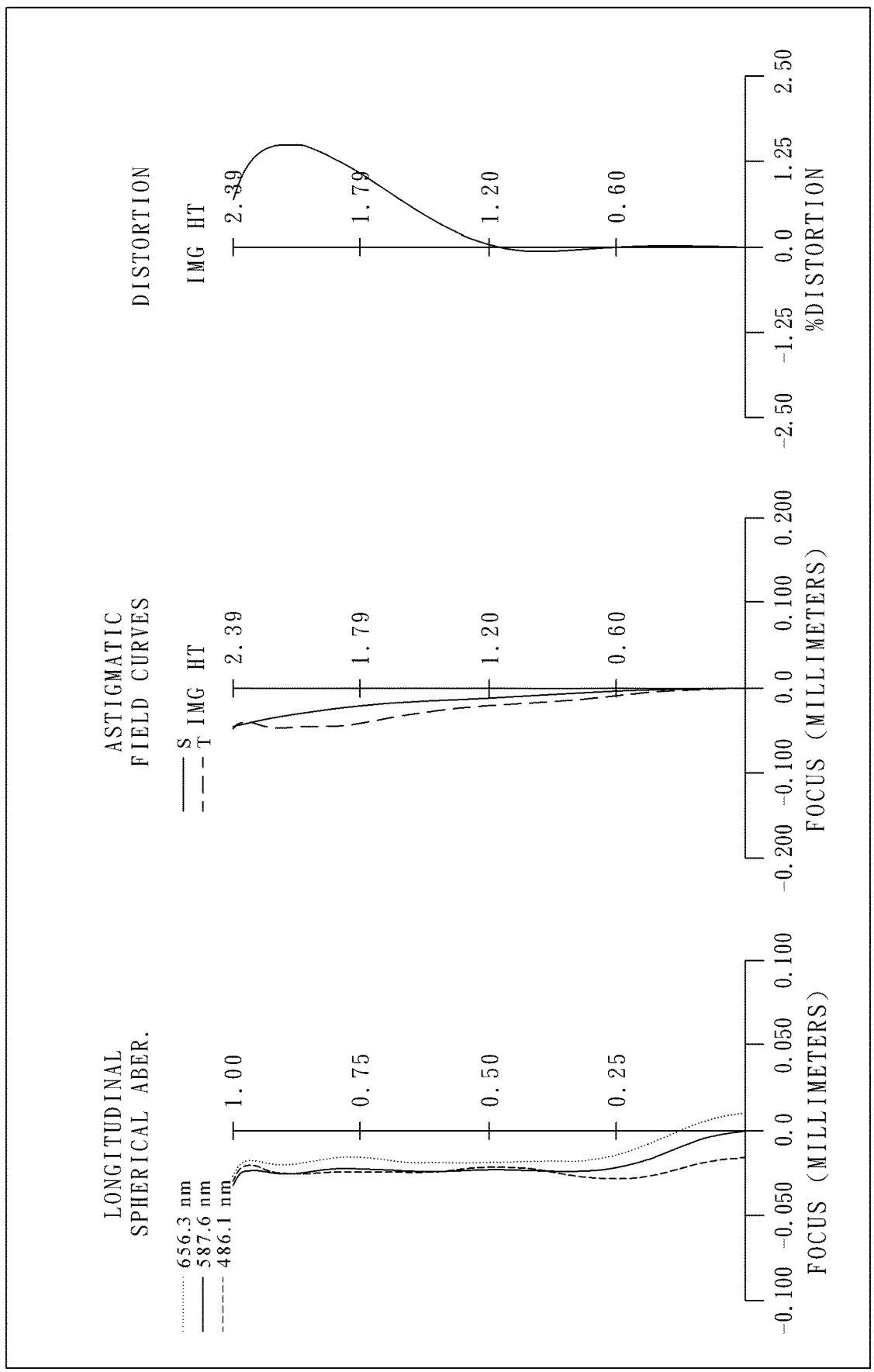
FIG. 4B shows longitudinal spherical aberration curves, astigmatic field curves and a distortion curve of the imaging apparatus according to the 4th embodiment.

FIG. 4A is a schematic view of an imaging apparatus according to the 4th embodiment of the present disclosure. FIG. 4B shows, in order from left to right, longitudinal spherical aberration curves, astigmatic field curves and a distortion curve of the imaging apparatus according to the 4th embodiment.

In FIG. 4A, the imaging apparatus includes an image system lens assembly (not otherwise herein labeled) of the present disclosure and an image sensor 480. The image system lens assembly includes five lens elements, the five lens elements being, in order from an object side to an image side, a first lens element 410 a second lens element 420, a third lens element 430, a fourth lens element 440, and a fifth lens element 450. Any two adjacent lens elements of the first lens element 410, the second lens element 420, the third lens element 430, the fourth lens element 440, and the fifth lens element 450 have an air gap on an optical axis there between and no other lens elements are inserted there between.

The first lens element 410 with positive refractive power has an object-side surface 411 being convex in a paraxial region thereof, an image-side surface 412 being convex in a paraxial region thereof, and both the object-side surface 411 and the image-side surface 412 being aspheric. The first lens element 410 is made of glass material.

The second lens element 420 with negative refractive power has an object-side surface 421 being convex in a paraxial region thereof, an image-side surface 422 being concave in a paraxial region thereof, and both the object-side surface 421 and the image-side surface 422 being aspheric. The second lens element 420 is made of plastic material.

The third lens element 430 with negative refractive power has an object-side surface 431 being concave in a paraxial region thereof, and an image-side surface 432 being concave in a paraxial region thereof. The third lens element 430 is made of plastic material.

The fourth lens element 440 with positive refractive power has an object-side surface 441 being convex in a paraxial region thereof, an image-side surface 442 being convex in a paraxial region thereof, and both the object-side surface 441 and the image-side surface 442 being aspheric. The fourth lens element 440 is made of plastic material.

The fifth lens element 450 with negative refractive power has an object-side surface 451 being concave in a paraxial region thereof, an image-side surface 452 being concave in a paraxial region thereof, both the object-side surface 451 and the image-side surface 452 being aspheric, and at least one inflection point on both the object-side surface 451 and the image-side surface 452 thereof. The fifth lens element 450 is made of plastic material.

The image system lens assembly further includes an aperture stop 400 disposed at an object side of the first lens element 410, a stop 401 disposed between the third lens element 430 and the fourth lens element 440, and an IR cut filter 460 disposed between the fifth lens element 450 and an image surface 470. The IR cut filter 460 is made of glass material and will not affect a focal length of the image system lens assembly. The image sensor 480 is disposed on or near the image surface 470 of the image system lens assembly.

The detailed optical data of the 4th embodiment are shown in TABLE 7, and the aspheric surface data are shown in TABLE 8.

TABLE 7

(4th Embodiment)
f = 5.85 mm, Fno = 2.23, HFOV = 22.1 deg.

| Surface # | | Curvature Radius | | Thickness | Material | Index | Abbe # | Focal Length |
|---|---|---|---|---|---|---|---|---|
| 0 | Object | Planar | | Infinity | | | | |
| 1 | Ape. Stop | Planar | | −0.583 | | | | |
| 2 | Lens 1 | 1.721 | ASP | 0.980 | Glass | 1.542 | 62.9 | 3.15 |
| 3 | | −202.840 | ASP | 0.031 | | | | |
| 4 | Lens 2 | 13.804 | ASP | 0.205 | Plastic | 1.614 | 26.0 | −6.84 |
| 5 | | 3.202 | ASP | 1.451 | | | | |
| 6 | Lens 3 | −5.869 | ASP | 0.200 | Plastic | 1.614 | 26.0 | −6.85 |
| 7 | | 15.026 | ASP | 0.115 | | | | |
| 8 | Stop | Planar | | 0.201 | | | | |
| 9 | Lens 4 | 6.878 | ASP | 0.709 | Plastic | 1.660 | 20.3 | 7.94 |
| 10 | | −21.155 | ASP | 0.722 | | | | |
| 11 | Lens 5 | −9.119 | ASP | 0.212 | Plastic | 1.544 | 56.0 | −6.86 |
| 12 | | 6.365 | ASP | 0.400 | | | | |
| 13 | IR Cut Filter | Planar | | 0.210 | Glass | 1.517 | 64.2 | — |
| 14 | | Planar | | 0.219 | | | | |
| 15 | Image Surface | Planar | | — | | | | |

\* Reference wavelength is d-line 587.6 nm.
\* The effective radius of Surface 8 is 1.320 mm.

TABLE 8

Aspheric Coefficients

| Surface # | 2 | 3 | 4 | 5 | 6 |
|---|---|---|---|---|---|
| k = | −3.4920E−01 | −9.0000E+01 | −8.0993E+01 | −4.5231E+01 | 1.3792E+01 |
| A4 = | 7.8045E−03 | −1.8617E−01 | −1.9898E−01 | 1.4571E−01 | 1.6616E−02 |
| A6 = | −4.8861E−03 | 4.7411E−01 | 5.8576E−02 | −5.8973E−02 | −2.3811E−02 |
| A8 = | 7.6529E−03 | −5.3405E−01 | −7.1002E−01 | 4.4190E−02 | 1.1368E−01 |
| A10 = | −2.6409E−03 | 3.1611E−01 | 4.5167E−01 | −3.4975E−02 | −1.9861E−01 |
| A12 = | 1.9111E−04 | −9.5983E−02 | −1.4742E−01 | 1.8814E−02 | 1.3597E−01 |
| A14 = | | 1.1827E−02 | 1.9958E−02 | | −4.0382E−02 |

| Surface # | 7 | 9 | 10 | 11 | 12 |
|---|---|---|---|---|---|
| k = | −9.0000E+01 | −6.8175E+01 | 8.6382E+01 | 1.4948E+01 | −9.0000E+01 |
| A4 = | −1.9044E−02 | −7.3007E−02 | −6.2588E−02 | −2.0646E−01 | −1.7831E−01 |

TABLE 8-continued

| Aspheric Coefficients | | | | |
|---|---|---|---|---|
| A6 = | 5.1308E−02 | 1.2132E−02 | 1.3757E−03 | 1.5228E−01 | 1.2033E−01 |
| A8 = | −2.9629E−04 | −2.2754E−02 | −8.8357E−04 | −3.7115E−02 | −3.3773E−02 |
| A10 = | −1.9608E−02 | 3.0930E−02 | 5.2044E−03 | −1.2457E−03 | 3.0605E−03 |
| A12 = | 5.4962E−03 | −1.2375E−02 | −2.5557E−03 | 2.5887E−03 | 5.5865E−04 |
| A14 = | −7.1120E−05 | 1.5918E−03 | 3.8618E−04 | −5.2127E−04 | −1.5535E−04 |
| A16 = | | | | 3.4872E−05 | 1.0226E−05 |

In the 4th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 4th embodiment, so an explanation in this regard will not be provided again.

Moreover, these parameters can be calculated from TABLE 7 and TABLE 8 and satisfy the conditions stated in table below.

| 4th Embodiment | | | |
|---|---|---|---|
| f [mm] | 5.85 | TL/BL | 6.82 |
| Fno | 2.23 | TL/f | 0.97 |
| HFOV [deg.] | 22.1 | TL/ImgH | 2.37 |
| (V2 + V4)/V1 | 0.74 | (R3 − R4)/(R3 + R4) | 0.62 |
| V4 | 20.3 | (R9 + R10)/(R9 − R10) | 0.18 |
| BL/T23 | 0.57 | f/f1 | 1.86 |
| SL/TL | 0.90 | f/f3 | −0.85 |
| T12/CT1 | 0.03 | f/ImgH | 2.45 |
| T23/T34 | 4.59 | f/R1 | 3.40 |
| T45/CT5 | 3.41 | |f2/f5| | 1.00 |
| TD/T23 | 3.33 | |Sag11/f1| | 0.19 |
| TL [mm] | 5.66 | Y52/Y11 | 1.65 |

5th Embodiment

Figure 5A:
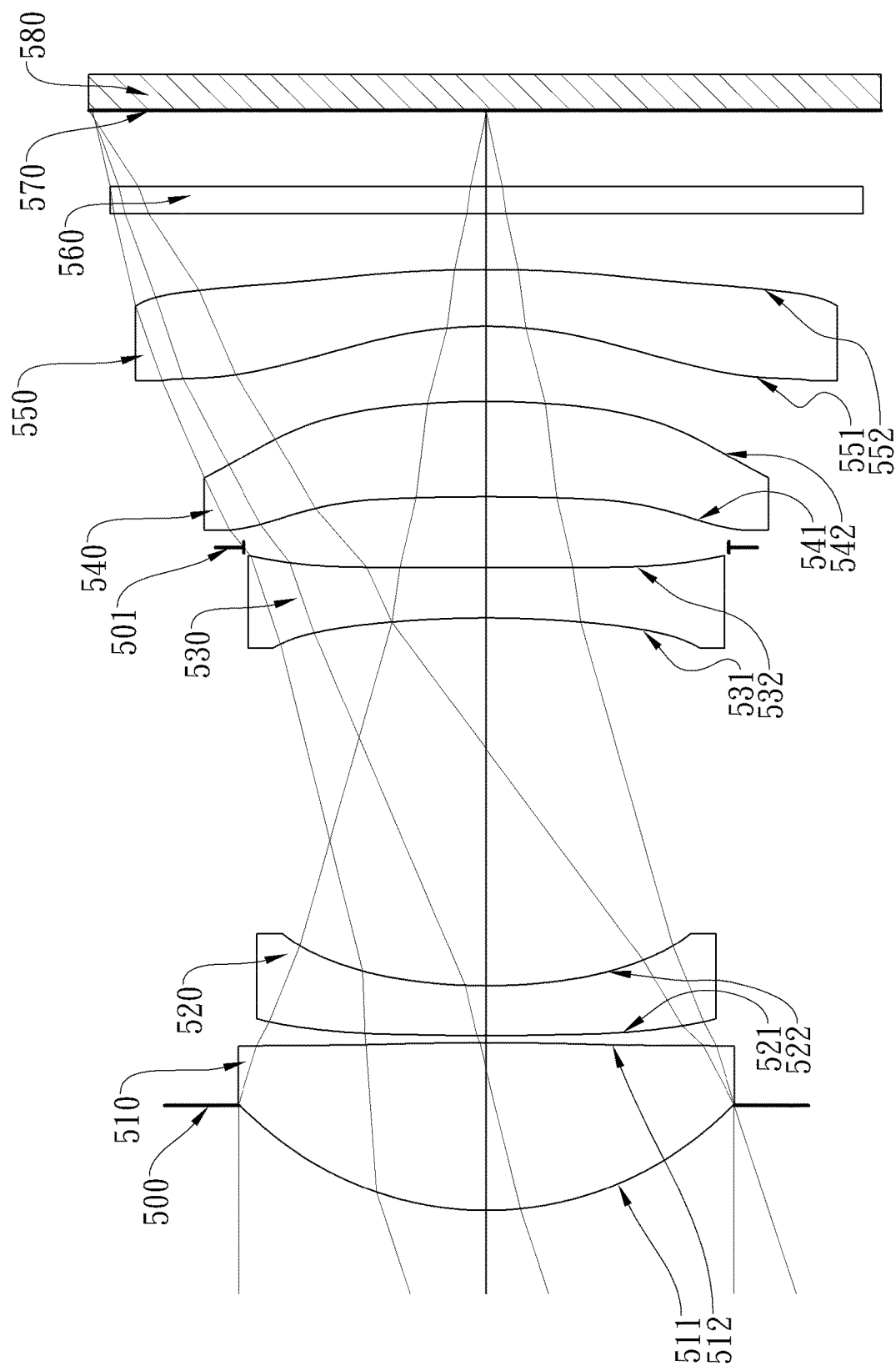
FIG. 5A is a schematic view of an imaging apparatus according to the 5th embodiment of the present disclosure.
Figure 5B:
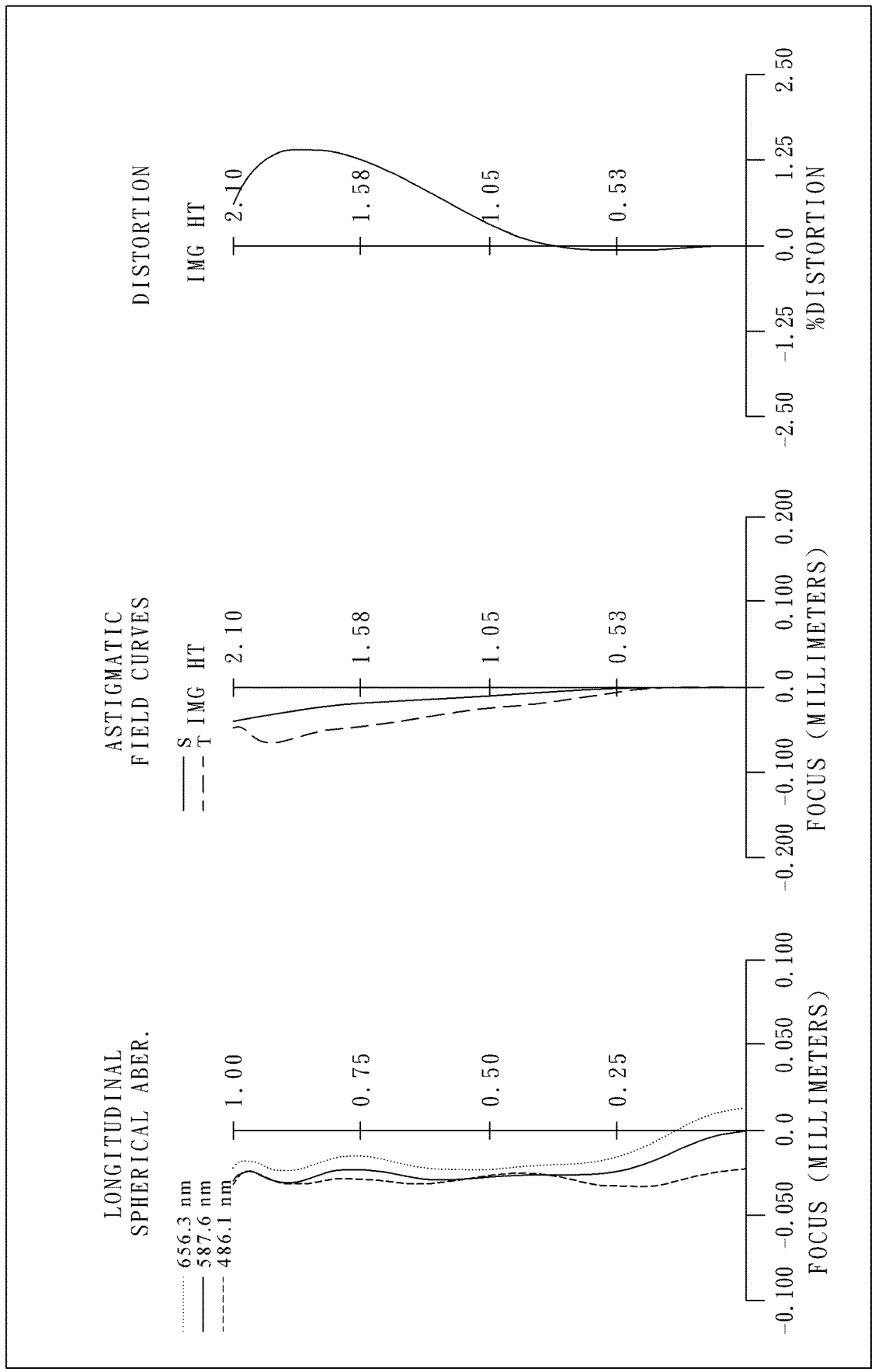
FIG. 5B shows longitudinal spherical aberration curves, astigmatic field curves and a distortion curve of the imaging apparatus according to the 5th embodiment.

FIG. 5A is a schematic view of an imaging apparatus according to the 5th embodiment of the present disclosure. FIG. 5B shows, in order from left to right, longitudinal spherical aberration curves, astigmatic field curves and a distortion curve of the imaging apparatus according to the 5th embodiment.

In FIG. 5A, the imaging apparatus includes an image system lens assembly (not otherwise herein labeled) of the present disclosure and an image sensor 580. The image system lens assembly includes five lens elements, the five lens elements being, in order from an object side to an image side, a first lens element 510, a second lens element 520, a third lens element 530, a fourth lens element 540, and a fifth lens element 550. Any two adjacent lens elements of the first lens element 510, the second lens element 520, the third lens element 530, the fourth lens element 540, and the fifth lens element 550 have an air gap on an optical axis there between and no other lens elements are inserted there between.

The first lens element 510 with positive refractive power has an object-side surface 511 being convex in a paraxial region thereof, an image-side surface 512 being concave in a paraxial region thereof, and both the object-side surface 511 and the image-side surface 512 being aspheric. The first lens element 510 is made of plastic material.

The second lens element 520 with negative refractive power has an object-side surface 521 being convex in a paraxial region thereof, an image-side surface 522 being concave in a paraxial region thereof, and both the object-side surface 521 and the image-side surface 522 being aspheric. The second lens element 520 is made of plastic material.

The third lens element 530 with negative refractive power has an object-side surface 531 being concave in a paraxial region thereof, an image-side surface 532 being convex in a paraxial region thereof, and both the object-side surface 531 and the image-side surface 532 being aspheric. The third lens element 530 is made of plastic material.

The fourth lens element 540 with positive refractive power has an object-side surface 541 being concave in a paraxial region thereof, an image-side surface 542 being convex in a paraxial region thereof, and both the object-side surface 541 and the image-side surface 542 being aspheric. The fourth lens element 540 is made of plastic material.

The fifth lens element 550 with negative refractive power has an object-side surface 551 being concave in a paraxial region thereof, an image-side surface 552 being convex in a paraxial region thereof, both the object-side surface 551 and the image-side surface 552 being aspheric, and at least one inflection point on both the object-side surface 551 and the image-side surface 552 thereof. The fifth lens element 550 is made of plastic material.

The image system lens assembly further includes an aperture stop 500 disposed at an object side of the first lens element 510, a stop 501 disposed between the third lens element 530 and the fourth lens element 540, and an IR cut filter 560 disposed between the fifth lens element 550 and an image surface 570. The IR cut filter 560 is made of glass material and will not affect the focal length of the image system lens assembly. The image sensor 580 is disposed on or near the image surface 570 of the image system lens assembly.

The detailed optical data of the 5th embodiment are shown in TABLE 9, and the aspheric surface data are shown in TABLE 10.

TABLE 9

(5th Embodiment)
f = 6.35 mm, Fno = 2.41, HFOV = 18.3 deg.

| Surface # | | Curvature Radius | | Thickness | Material | Index | Abbe # | Focal Length |
|---|---|---|---|---|---|---|---|---|
| 0 | Object | Planar | | Infinity | | | | |
| 1 | Ape. Stop | Planar | | −0.559 | | | | |
| 2 | Lens 1 | 1.773 | ASP | 0.891 | Plastic | 1.545 | 56.0 | 3.31 |

TABLE 9-continued (5th Embodiment)
f = 6.35 mm, Fno = 2.41, HFOV = 18.3 deg.

| Surface # | | Curvature Radius | Thickness | Material | Index | Abbe # | Focal Length |
|---|---|---|---|---|---|---|---|
| 3 | | 90.821 ASP | 0.039 | | | | |
| 4 | Lens 2 | 8.835 ASP | 0.265 | Plastic | 1.642 | 22.5 | −6.89 |
| 5 | | 2.912 ASP | 1.956 | | | | |
| 6 | Lens 3 | −5.531 ASP | 0.269 | Plastic | 1.566 | 37.4 | −15.01 |
| 7 | | −16.130 ASP | 0.106 | | | | |
| 8 | Stop | Planar | 0.268 | | | | |
| 9 | Lens 4 | −10.954 ASP | 0.509 | Plastic | 1.669 | 19.5 | 10.94 |
| 10 | | −4.468 ASP | 0.399 | | | | |
| 11 | Lens 5 | −2.311 ASP | 0.300 | Plastic | 1.534 | 55.9 | −5.73 |
| 12 | | −9.896 ASP | 0.300 | | | | |
| 13 | IR Cut Filter | Planar | 0.145 | Glass | 1.517 | 64.2 | — |
| 14 | | Planar | 0.402 | | | | |
| 15 | Image Surface | Planar | — | | | | |

* Reference wavelength is d-line 587.6 nm.
* The effective radius of Surface 8 is 1.290 mm.

TABLE 10

Aspheric Coefficients

| Surface # | 2 | 3 | 4 | 5 | 6 |
|---|---|---|---|---|---|
| k = | −3.5910E−01 | 9.0000E+01 | −7.4415E+01 | −3.9223E+01 | −1.1571E+01 |
| A4 = | 7.1989E−03 | −1.9505E−01 | −2.0572E−01 | 1.4881E−01 | 7.0324E−02 |
| A6 = | −4.6663E−03 | 4.9572E−01 | 6.1063E−01 | −5.9182E−02 | −2.6780E−01 |
| A8 = | 7.4458E−03 | −5.6587E−01 | −7.5637E−01 | 3.1185E−02 | 4.1633E−01 |
| A10 = | −2.1610E−03 | 3.3805E−01 | 4.9085E−01 | −1.7040E−02 | −3.5485E−01 |
| A12 = | −2.8778E−04 | −1.0374E−01 | −1.6242E−01 | 1.2907E−02 | 1.4383E−01 |
| A14 = | | 1.2957E−02 | 2.2175E−02 | | −2.4468E−02 |

| Surface # | 7 | 9 | 10 | 11 | 12 |
|---|---|---|---|---|---|
| k = | 4.9617E+01 | 3.5329E+01 | 3.0917E+00 | −1.7264E+01 | 2.3121E+01 |
| A4 = | 1.8423E−01 | 9.6153E−02 | 5.5403E−02 | −1.9827E−01 | −9.7146E−02 |
| A6 = | −4.4115E−01 | −2.9068E−01 | −1.6136E−01 | 3.3925E−01 | 1.6808E−01 |
| A8 = | 6.0782E−01 | 2.1458E−01 | 1.1479E−01 | −2.9754E−01 | −1.1162E−01 |
| A10 = | −4.2971E−01 | −6.6676E−02 | −4.7168E−02 | 1.5613E−01 | 3.6949E−02 |
| A12 = | 1.5279E−01 | 1.2233E−02 | 1.3925E−02 | −4.7717E−02 | −5.7390E−03 |
| A14 = | −2.1934E−02 | −1.6461E−03 | −2.0162E−03 | 7.8773E−03 | 2.4949E−04 |
| A16 = | | | | −5.5413E−04 | 1.4826E−05 |

In the 5th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 5th embodiment, so an explanation in this regard will not be provided again.

Moreover, these parameters can be calculated from TABLE 9 and TABLE 10 and satisfy the conditions stated in table below.

| 5th Embodiment | | | |
|---|---|---|---|
| f [mm] | 6.35 | TL/BL | 6.91 |
| Fno | 2.41 | TL/f | 0.92 |
| HFOV [deg.] | 18.3 | TL/ImgH | 2.79 |
| (V2 + V4)/V1 | 0.75 | (R3 − R4)/(R3 + R4) | 0.50 |
| V4 | 19.5 | (R9 + R10)/(R9 − R10) | −1.61 |
| BL/T23 | 0.43 | f/f1 | 1.92 |
| SL/TL | 0.90 | f/f3 | −0.42 |
| T12/CT1 | 0.04 | f/ImgH | 3.02 |
| T23/T34 | 5.23 | f/R1 | 3.58 |
| T45/CT5 | 1.33 | |f2/f5| | 1.20 |

-continued

| 5th Embodiment | | | |
|---|---|---|---|
| TD/T23 | 2.56 | |Sag11/f1| | 0.17 |
| TL [mm] | 5.85 | Y52/Y11 | 1.41 |

6th Embodiment

Figure 6A:
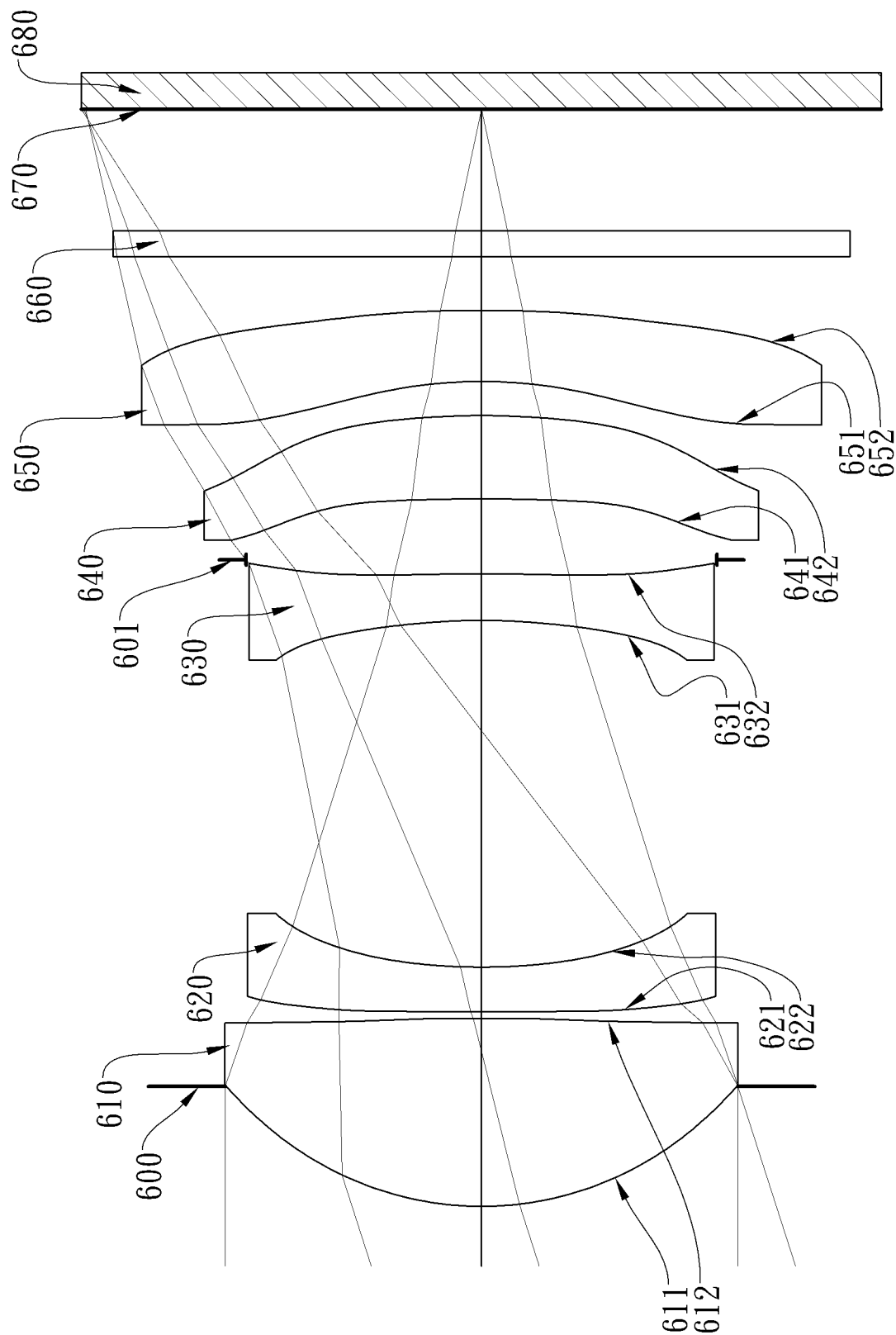
FIG. 6A is a schematic view of an imaging apparatus according to the 6th embodiment of the present disclosure.
Figure 6B:
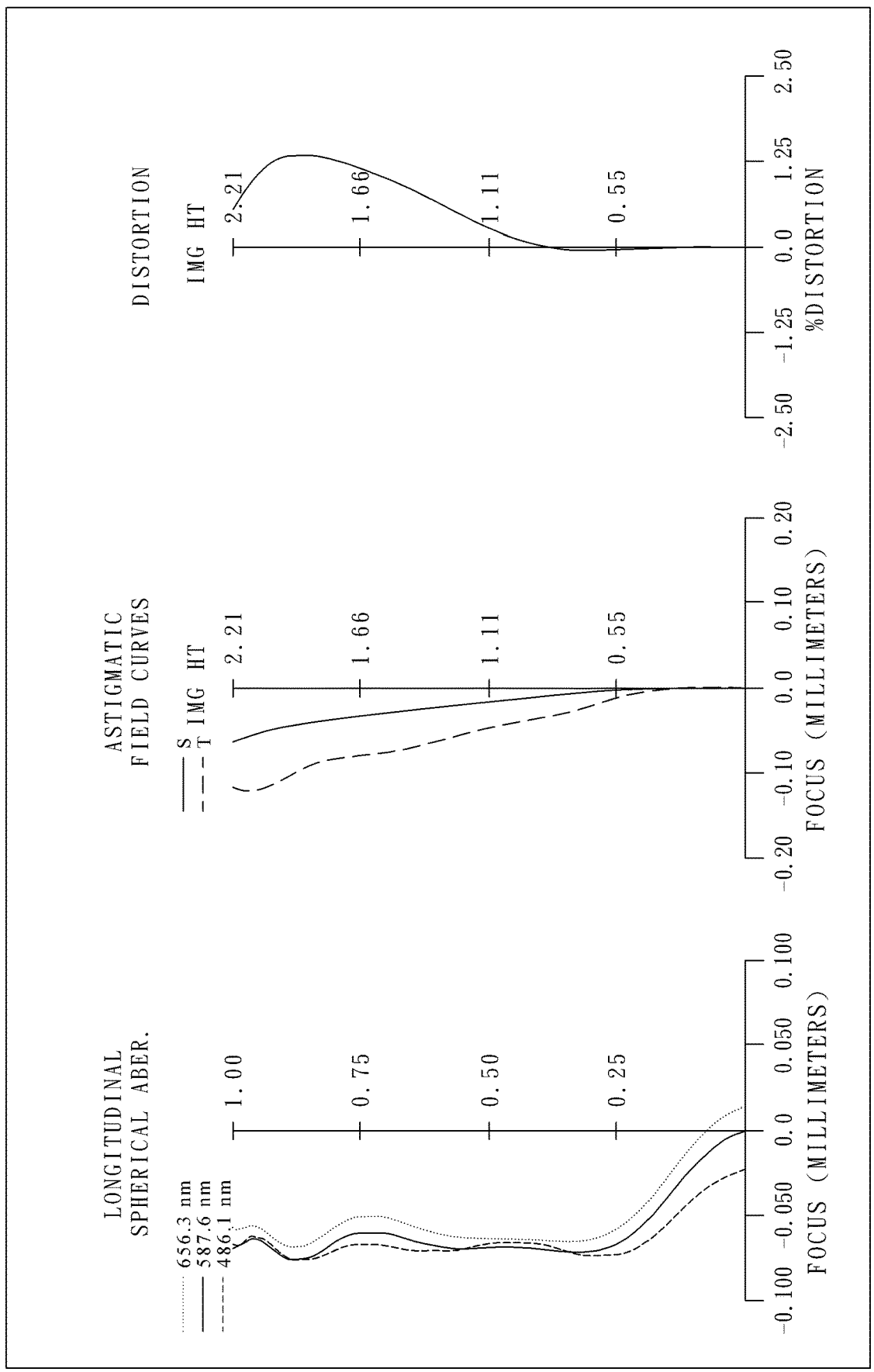
FIG. 6B shows longitudinal spherical aberration curves, astigmatic field curves and a distortion curve of the imaging apparatus according to the 6th embodiment.

FIG. 6A is a schematic view of an imaging apparatus according to the 6th embodiment of the present disclosure. FIG. 6B shows, in order from left to right, longitudinal spherical aberration curves, astigmatic field curves and a distortion curve of the imaging apparatus according to the 6th embodiment.

In FIG. 6A, the imaging apparatus includes an image system lens assembly (not otherwise herein labeled) of the present disclosure and an image sensor 680. The image system lens assembly includes five lens elements, the five lens elements being, in order from an object side to an image side, a first lens element 610, a second lens element 620, a third lens element 630, a fourth lens element 640, and a fifth lens element 650. Any two adjacent lens elements of the first lens element 610, the second lens element 620, the third lens element 630, the fourth lens element 640, and the fifth lens element 650 have an air gap on an optical axis there between and no other lens elements are inserted there between.

The first lens element 610 with positive refractive power has an object-side surface 611 being convex in a paraxial region thereof, an image-side surface 612 being convex in a paraxial region thereof, and both the object-side surface 611 and the image-side surface 612 being aspheric. The first lens element 610 is made of plastic material.

The second lens element 620 with negative refractive power has an object-side surface 621 being convex in a paraxial region thereof, an image-side surface 622 being concave in a paraxial region thereof, and both the object-side surface 621 and the image-side surface 622 being aspheric. The second lens element 620 is made of plastic material.

The third lens element 630 with negative refractive power has an object-side surface 631 being concave in a paraxial region thereof, an image-side surface 632 being convex in a paraxial region thereof, and both the object-side surface 631 and the image-side surface 632 being aspheric. The third lens element 630 is made of plastic material.

The fourth lens element 640 with positive refractive power has an object-side surface 641 being concave in a paraxial region thereof, an image-side surface 642 being convex in a paraxial region thereof, and both the object-side surface 641 and the image-side surface 642 being aspheric. The fourth lens element 640 is made of plastic material.

The fifth lens element 650 with negative refractive power has an object-side surface 651 being concave in a paraxial region thereof, an image-side surface 652 being convex in a paraxial region thereof, both the object-side surface 651 and the image-side surface 652 being aspheric, and at least one inflection point on the object-side surface 651 thereof. The fifth lens element 650 is made of plastic material.

The image system lens assembly further includes an aperture stop 600 disposed at an object side of the first lens element 610, a stop 601 disposed between the third lens element 630 and the fourth lens element 640, and an IR cut filter 660 disposed between the fifth lens element 650 and an image surface 670. The IR cut filter 660 is made of glass material and will not affect a focal length of the image system lens assembly. The image sensor 680 is disposed on or near the image surface 670 of the image system lens assembly.

The detailed optical data of the 6th embodiment are shown in TABLE 11, and the aspheric surface data are shown in TABLE 12.

TABLE 11

(6th Embodiment)
f = 6.93 mm, Fno = 2.43, HFOV = 17.8 deg.

| Surface # | | Curvature Radius | Thickness | Material | Index | Abbe # | Focal Length |
|---|---|---|---|---|---|---|---|
| 0 | Object | Planar | Infinity | | | | |
| 1 | Ape. Stop | Planar | −0.667 | | | | |
| 2 | Lens 1 | 1.800 ASP | 1.046 | Plastic | 1.534 | 55.9 | 3.30 |
| 3 | | −66.059 ASP | 0.036 | | | | |
| 4 | Lens 2 | 12.874 ASP | 0.250 | Plastic | 1.650 | 21.8 | −6.61 |
| 5 | | 3.196 ASP | 1.931 | | | | |
| 6 | Lens 3 | −3.444 ASP | 0.260 | Plastic | 1.544 | 56.0 | −11.53 |
| 7 | | −7.840 ASP | 0.078 | | | | |
| 8 | Stop | Planar | 0.339 | | | | |
| 9 | Lens 4 | −10.049 ASP | 0.464 | Plastic | 1.669 | 19.5 | 11.86 |
| 10 | | −4.515 ASP | 0.190 | | | | |
| 11 | Lens 5 | −2.783 ASP | 0.395 | Plastic | 1.544 | 56.0 | −6.67 |
| 12 | | −12.523 ASP | 0.300 | | | | |
| 13 | IR Cut Filter | Planar | 0.145 | Glass | 1.517 | 64.2 | — |
| 14 | | Planar | 0.676 | | | | |
| 15 | Image Surface | Planar | — | | | | |

* Reference wavelength is d-line 587.6 nm.
* The effective radius of Surface 8 is 1.310 mm.

TABLE 12

Aspheric Coefficients

| Surface # | 2 | 3 | 4 | 5 | 6 |
|---|---|---|---|---|---|
| k = | −3.5886E−01 | −8.5776E+01 | −9.0000E+01 | −5.6217E+01 | −1.7743E+01 |
| A4 = | 7.5882E−03 | −1.9057E−01 | −2.0815E−01 | 1.4684E−01 | 7.1552E−02 |
| A6 = | −5.3285E−03 | 4.9623E−01 | 6.1191E−01 | −6.7080E−02 | −2.7354E−01 |
| A8 = | 6.7876E−03 | −5.6579E−01 | −7.5649E−01 | 3.2499E−02 | 4.0988E−01 |
| A10 = | −1.9478E−03 | 3.3783E−01 | 4.9049E−01 | −1.4222E−02 | −3.5277E−01 |
| A12 = | 1.8536E−05 | −1.0376E−01 | −1.6274E−01 | 9.8618E−03 | 1.4409E−01 |
| A14 = | | 1.3010E−02 | 2.2183E−02 | | −2.4422E−02 |

| Surface # | 7 | 9 | 10 | 11 | 12 |
|---|---|---|---|---|---|
| k = | −6.1854E+01 | 3.9407E+01 | 2.3522E+00 | −2.2486E+01 | 2.2921E+01 |
| A4 = | 2.1018E−01 | 9.5763E−02 | 5.2091E−02 | −2.0279E−01 | −1.1515E−01 |
| A6 = | −4.4289E−01 | −2.9137E−01 | −1.6451E−01 | 3.4197E−01 | 1.6787E−01 |
| A8 = | 5.9834E−01 | 2.1251E−01 | 1.1723E−01 | −2.9732E−01 | −1.1021E−01 |
| A10 = | −4.3091E−01 | −6.7496E−02 | −4.7222E−02 | 1.5612E−01 | 3.6783E−02 |

TABLE 12-continued

| Aspheric Coefficients | | | | | |
|---|---|---|---|---|---|
| A12 = | 1.5455E−01 | 1.2278E−02 | 1.3497E−02 | −4.7740E−02 | −5.8231E−03 |
| A14 = | −2.1918E−02 | −1.3692E−03 | −1.8688E−03 | 7.7500E−03 | 2.3209E−04 |
| A16 = | | | | −5.1592E−04 | 2.3021E−05 |

In the 6th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 6th embodiment, so an explanation in this regard will not be provided again.

Moreover, these parameters can be calculated from TABLE 11 and TABLE 12 and satisfy the conditions stated in table below.

| 6th Embodiment | | | |
|---|---|---|---|
| f [mm] | 6.93 | TL/BL | 5.45 |
| Fno | 2.43 | TL/f | 0.88 |
| HFOV [deg.] | 17.8 | TL/ImgH | 2.76 |
| (V2 + V4)/V1 | 0.74 | (R3 − R4)/(R3 + R4) | 0.60 |
| V4 | 19.5 | (R9 + R10)/(R9 − R10) | −1.57 |
| BL/T23 | 0.58 | f/f1 | 2.10 |
| SL/TL | 0.89 | f/f3 | −0.60 |
| T12/CT1 | 0.03 | f/ImgH | 3.13 |
| T23/T34 | 4.63 | f/R1 | 3.85 |
| T45/CT5 | 0.48 | |f2/f5| | 0.99 |
| TD/T23 | 2.58 | |Sag11/f1| | 0.20 |
| TL [mm] | 6.11 | Y52/Y11 | 1.33 |

7th Embodiment

Figure 7A:
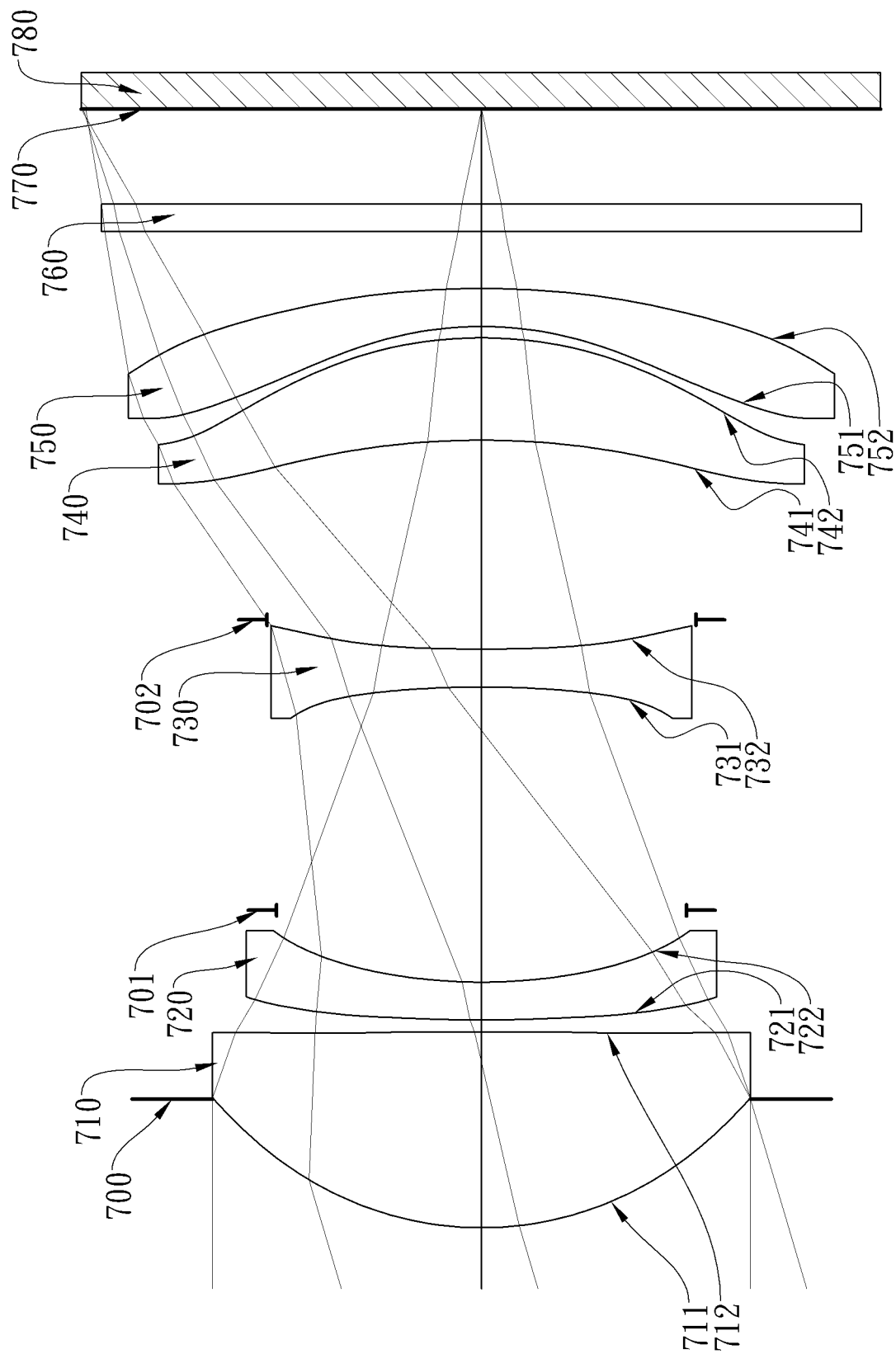
FIG. 7A is a schematic view of an imaging apparatus according to the 7th embodiment of the present disclosure.
Figure 7B:
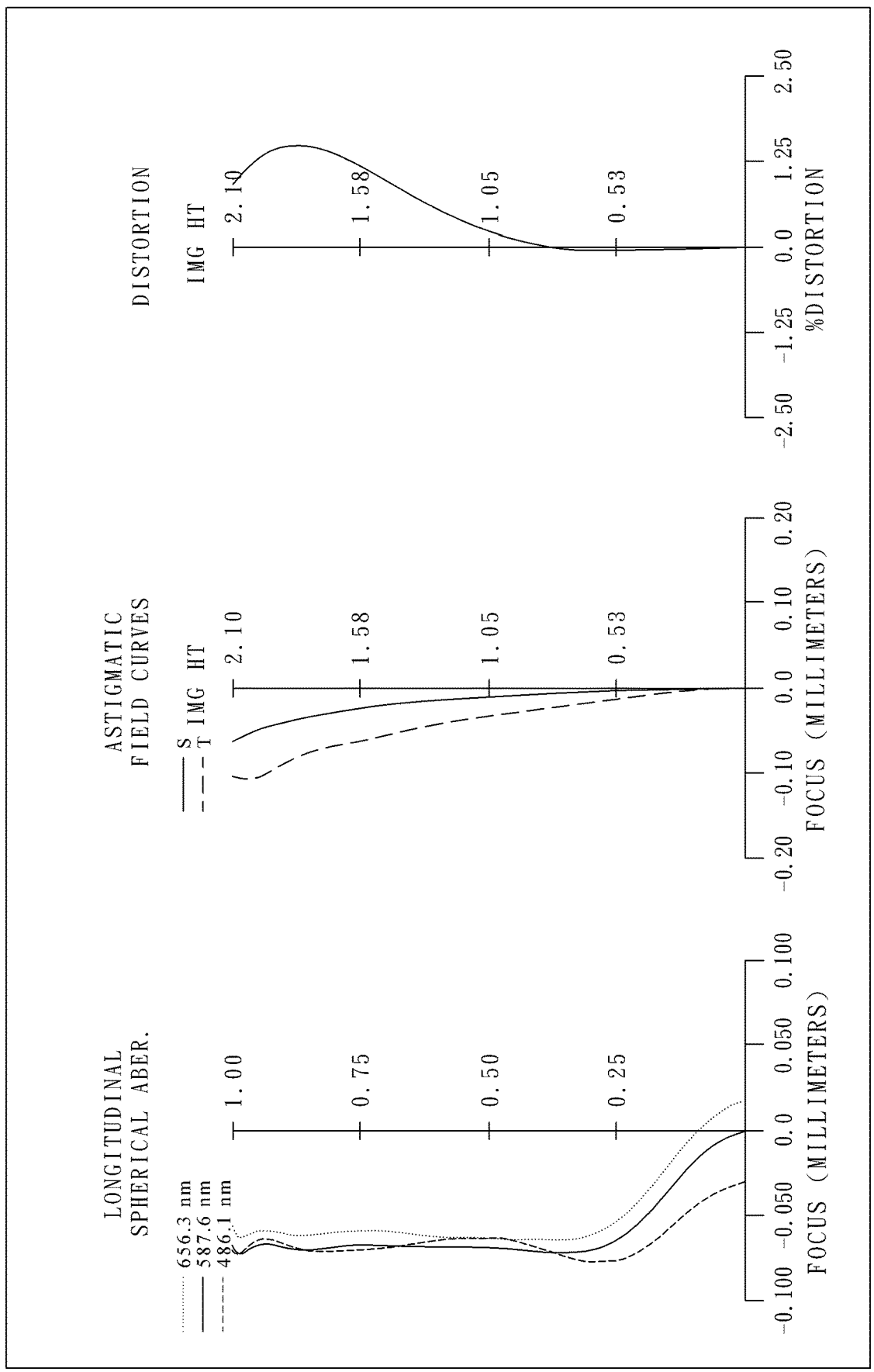
FIG. 7B shows longitudinal spherical aberration curves, astigmatic field curves and a distortion curve of the imaging apparatus according to the 7th embodiment.

FIG. 7A is a schematic view of an imaging apparatus according to the 7th embodiment of the present disclosure. FIG. 7B shows, in order from left to right, longitudinal spherical aberration curves, astigmatic field curves and a distortion curve of the imaging apparatus according to the 7th embodiment.

In FIG. 7A, the imaging apparatus includes an image system lens assembly (not otherwise herein labeled) of the present disclosure and an image sensor 780. The image system lens assembly includes five lens elements, the five lens elements being, in order from an object side to an image side, a first lens element 710, a second lens element 720, a third lens element 730, a fourth lens element 740, and a fifth lens element 750. Any two adjacent lens elements of the first lens element 710, the second lens element 720, the third lens element 730, the fourth lens element 740, and the fifth lens element 750 have an air gap on an optical axis there between and no other lens elements are inserted there between.

The first lens element 710 with positive refractive power has an object-side surface 711 being convex in a paraxial region thereof, an image-side surface 712 being concave in a paraxial region thereof, and both the object-side surface 711 and the image-side surface 712 being aspheric. The first lens element 710 is made of plastic material.

The second lens element 720 with negative refractive power has an object-side surface 721 being convex in a paraxial region thereof, an image-side surface 722 being concave in a paraxial region thereof, and both the object-side surface 721 and the image-side surface 722 being aspheric. The second lens element 720 is made of plastic material.

The third lens element 730 with negative refractive power has an object-side surface 731 being concave in a paraxial region thereof, an image-side surface 732 being concave in a paraxial region thereof, and both the object-side surface 731 and the image-side surface 732 being aspheric. The third lens element 730 is made of plastic material.

The fourth lens element 740 with positive refractive power has an object-side surface 741 being concave in a paraxial region thereof, an image-side surface 742 being convex in a paraxial region thereof, and both the object-side surface 741 and the image-side surface 742 being aspheric. The fourth lens element 740 is made of plastic material.

The fifth lens element 750 with negative refractive power has an object-side surface 751 being concave in a paraxial region thereof, an image-side surface 752 being convex in a paraxial region thereof, both the object-side surface 751 and the image-side surface 752 being aspheric, and at least one inflection point on both the object-side surface 751 and the image-side surface 752 thereof. The fifth lens element 750 is made of plastic material.

The image system lens assembly further includes an aperture stop 700 disposed at an object side of the first lens element 710, a stop 701 disposed between the second lens element 720 and the third lens element 730, a stop 702 disposed between the third lens element 730 and the fourth lens element 740, and an IR cut filter 760 disposed between the fifth lens element 750 and an image surface 770. The IR cut filter 760 is made of glass material and will not affect the focal length of the image system lens assembly. The image sensor 780 is disposed on or near the image surface 770 of the image system lens assembly.

The detailed optical data of the 7th embodiment are shown in TABLE 13, and the aspheric surface data are shown in TABLE 14.

TABLE 13

(7th Embodiment)
f = 7.09 mm, Fno = 2.50, HFOV = 16.5 deg.

| Surface # | | Curvature Radius | | Thickness | Material | Index | Abbe # | Focal Length |
|---|---|---|---|---|---|---|---|---|
| 0 | Object | Planar | | Infinity | | | | |
| 1 | Ape. Stop | Planar | | −0.679 | | | | |
| 2 | Lens 1 | 1.735 | ASP | 1.032 | Plastic | 1.545 | 56.0 | 3.36 |
| 3 | | 26.570 | ASP | 0.063 | | | | |
| 4 | Lens 2 | 5.197 | ASP | 0.200 | Plastic | 1.669 | 19.5 | −8.22 |
| 5 | | 2.630 | ASP | 0.379 | | | | |

TABLE 13-continued (7th Embodiment)
f = 7.09 mm, Fno = 2.50, HFOV = 16.5 deg.

| Surface # | | Curvature Radius | | Thickness | Material | Index | Abbe # | Focal Length |
|---|---|---|---|---|---|---|---|---|
| 6 | Stop | Planar | | 1.178 | | | | |
| 7 | Lens 3 | −5.394 | ASP | 0.200 | Plastic | 1.559 | 40.4 | −6.36 |
| 8 | | 10.530 | ASP | 0.155 | | | | |
| 9 | Stop | Planar | | 0.947 | | | | |
| 10 | Lens 4 | −4.421 | ASP | 0.540 | Plastic | 1.669 | 19.5 | 6.46 |
| 11 | | −2.292 | ASP | 0.060 | | | | |
| 12 | Lens 5 | −1.917 | ASP | 0.200 | Plastic | 1.544 | 56.0 | −5.84 |
| 13 | | −5.007 | ASP | 0.300 | | | | |
| 14 | IR Cut Filter | Planar | | 0.145 | Glass | 1.517 | 64.2 | — |
| 15 | | Planar | | 0.502 | | | | |
| 16 | Image Surface | Planar | | — | | | | |

* Reference wavelength is d-line 587.6 nm.
* The effective radius of Surface 6 is 1.080 mm.
* The effective radius of Surface 9 is 1.130 mm.

TABLE 14

Aspheric Coefficients

| Surface # | 2 | 3 | 4 | 5 | 7 |
|---|---|---|---|---|---|
| k = | −3.3558E−01 | −7.9901E+01 | −6.7762E+01 | −3.6819E+01 | 1.9181E+01 |
| A4 = | 4.0601E−03 | −1.7751E−01 | −2.0658E−01 | 1.0224E−01 | 3.1497E−02 |
| A6 = | 1.2235E−03 | 3.8873E−01 | 5.5984E−01 | 2.0691E−02 | −8.9365E−02 |
| A8 = | −1.4844E−03 | −3.9735E−01 | −6.2982E−01 | −4.4862E−02 | 1.4404E−01 |
| A10 = | 2.3632E−03 | 2.1799E−01 | 3.7366E−01 | 1.3049E−02 | −2.5764E−01 |
| A12 = | −8.7045E−04 | −6.2873E−02 | −1.1378E−01 | 8.1517E−03 | 1.8429E−01 |
| A14 = | | 7.5464E−03 | 1.4579E−02 | | −5.4443E−02 |

| Surface # | 8 | 10 | 11 | 12 | 13 |
|---|---|---|---|---|---|
| k = | −7.5127E+01 | 5.0577E−01 | −1.0000E+00 | −5.7688E+00 | 0.0000E+00 |
| A4 = | 9.3313E−02 | −1.8229E−02 | −4.9771E−02 | −1.0302E−01 | −1.7894E−02 |
| A6 = | −5.1898E−02 | 2.9471E−02 | 2.8655E−02 | 5.9184E−02 | 3.8159E−03 |
| A8 = | 9.2285E−02 | −3.1403E−02 | 4.8990E−03 | 2.0272E−02 | 1.0070E−02 |
| A10 = | −1.5211E−01 | 2.0962E−02 | −1.3222E−02 | −3.0433E−02 | −7.6853E−03 |
| A12 = | 1.0047E−01 | −6.0015E−03 | 6.1422E−03 | 1.1466E−02 | 2.1484E−03 |
| A14 = | −2.3793E−02 | 6.0354E−04 | −8.6915E−04 | −1.7616E−03 | −2.8823E−04 |
| A16 = | | | | 8.8099E−05 | 1.7396E−05 |

In the 7th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 7th embodiment, so an explanation in this regard will not be provided again.

Moreover, these parameters can be calculated from TABLE 13 and TABLE 14 and satisfy the conditions stated in table below.

| 7th Embodiment | | | |
|---|---|---|---|
| f [mm] | 7.09 | TL/BL | 6.23 |
| Fno | 2.50 | TL/f | 0.83 |
| HFOV [deg.] | 16.5 | TL/ImgH | 2.81 |
| (V2 + V4)/V1 | 0.69 | (R3 − R4)/(R3 + R4) | 0.33 |
| V4 | 19.5 | (R9 + R10)/(R9 − R10) | −2.24 |
| BL/T23 | 0.61 | f/f1 | 2.11 |
| SL/TL | 0.88 | f/f3 | −1.12 |
| T12/CT1 | 0.06 | f/ImgH | 3.37 |
| T23/T34 | 1.41 | f/R1 | 4.09 |
| T45/CT5 | 0.30 | |f2/f5| | 1.41 |
| TD/T23 | 3.18 | |Sag11/f1| | 0.20 |
| TL [mm] | 5.90 | Y52/Y11 | 1.31 |

8th Embodiment

Figure 8A:
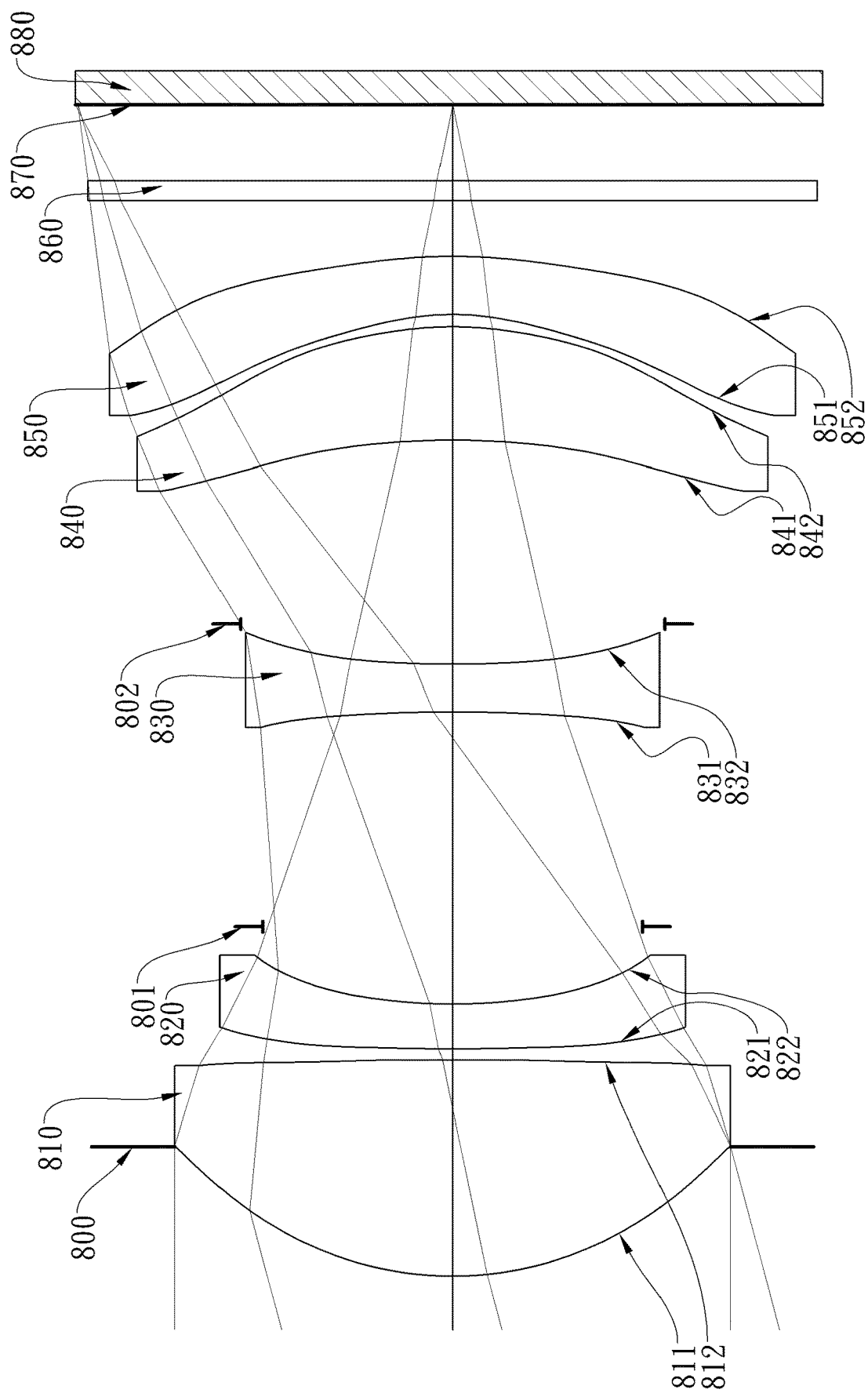
FIG. 8A is a schematic view of an imaging apparatus according to the 8th embodiment of the present disclosure.
Figure 8B:
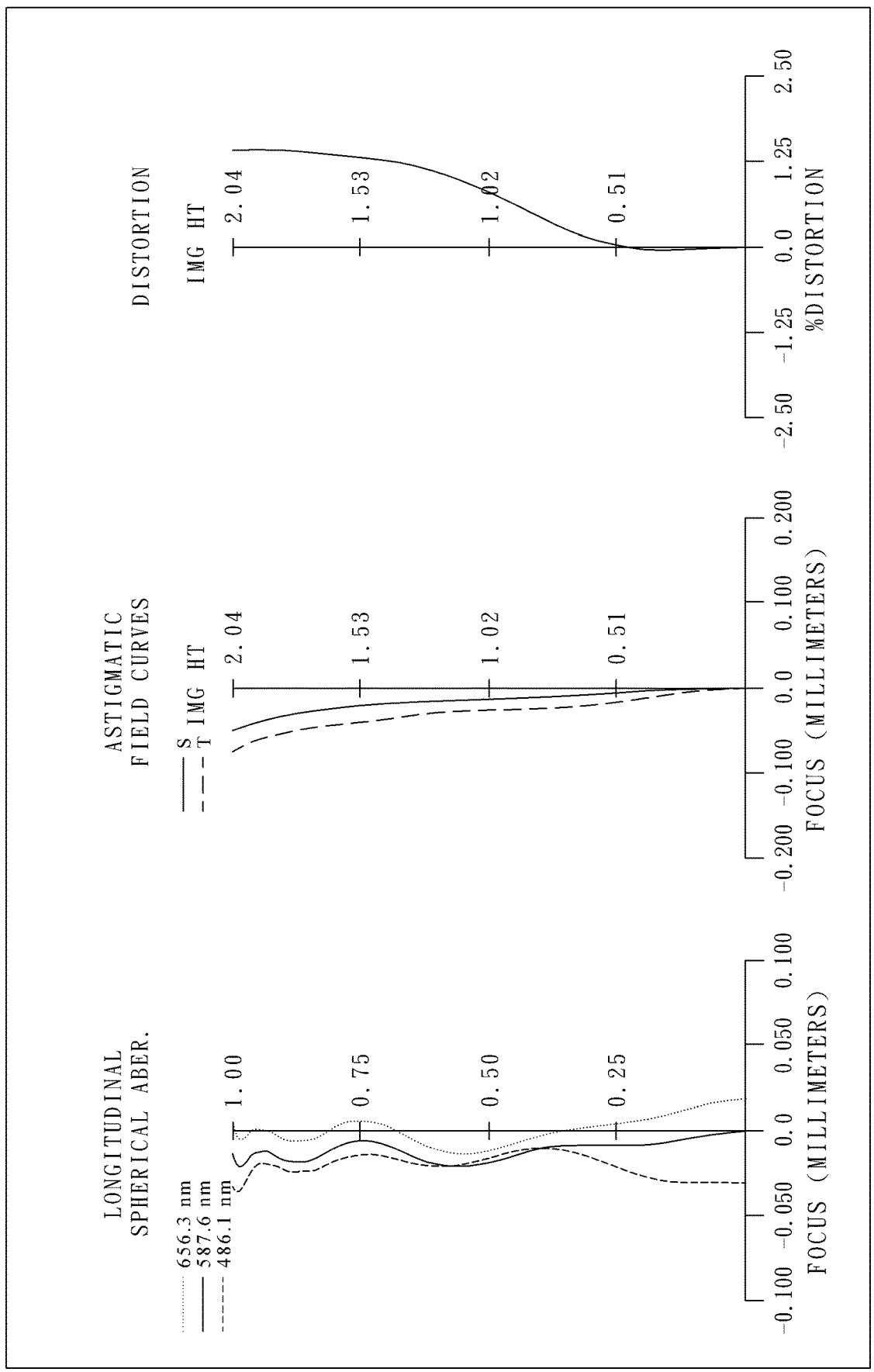
FIG. 8B shows longitudinal spherical aberration curves, astigmatic field curves and a distortion curve of the imaging apparatus according to the 8th embodiment.

FIG. 8A is a schematic view of an imaging apparatus according to the 8th embodiment of the present disclosure. FIG. 8B shows, in order from left to right, longitudinal spherical aberration curves, astigmatic field curves and a distortion curve of the imaging apparatus according to the 8th embodiment.

In FIG. 8A, the imaging apparatus includes an image system lens assembly (not otherwise herein labeled) of the present disclosure and an image sensor 880. The image system lens assembly includes five lens elements, the five lens elements being, in order from an object side to an image side, a first lens element 810, a second lens element 820, a third lens element 830, a fourth lens element 840, and a fifth lens element 850. Any two adjacent lens elements of the first lens element 810, the second lens element 820, the third lens element 830, the fourth lens element 840, and the fifth lens element 850 have an air gap on an optical axis there between and no other lens elements are inserted there between.

The first lens element 810 with positive refractive power has an object-side surface 811 being convex in a paraxial region thereof, an image-side surface 812 being concave in a paraxial region thereof, and both the object-side surface 811 and the image-side surface 812 being aspheric. The first lens element 810 is made of plastic material.

The second lens element 820 with negative refractive power has an object-side surface 821 being convex in a paraxial region thereof, an image-side surface 822 being concave in a paraxial region thereof, and both the object-side surface 821 and the image-side surface 822 being aspheric. The second lens element 820 is made of plastic material.

The third lens element 830 with negative refractive power has an object-side surface 831 being concave in a paraxial region thereof, an image-side surface 832 being concave in a paraxial region thereof, and both the object-side surface 831 and the image-side surface 832 being aspheric. The third lens element 830 is made of plastic material.

The fourth lens element 840 with positive refractive power has an object-side surface 841 being concave in a paraxial region thereof, an image-side surface 842 being convex in a paraxial region thereof, and both the object-side surface 841 and the image-side surface 842 being aspheric. The fourth lens element 840 is made of plastic material.

The fifth lens element 850 with negative refractive power has an object-side surface 851 being concave in a paraxial region thereof, an image-side surface 852 being convex in a paraxial region thereof, both the object-side surface 851 and the image-side surface 852 being aspheric, and at least one inflection point on both the object-side surface 851 and the image-side surface 852 thereof. The fifth lens element 850 is made of plastic material.

The image system lens assembly further includes an aperture stop 800 disposed at an object side of the first lens element 810, a stop 801 disposed between the second lens element 820 and the third lens element 830, a stop 802 disposed between the third lens element 830 and the fourth lens element 840, and an IR cut filter 860 disposed between the fifth lens element 850 and an image surface 870. The IR cut filter 860 is made of glass material and will not affect the focal length of the image system lens assembly. The image sensor 880 is disposed on or near the image surface 870 of the image system lens assembly.

The detailed optical data of the 8th embodiment are shown in TABLE 15, and the aspheric surface data are shown in TABLE 16.

TABLE 15

(8th Embodiment)
f = 7.51 mm, Fno = 2.48, HFOV = 15.0 deg.

| Surface # | | Curvature Radius | Thickness | Material | Index | Abbe # | Focal Length |
|---|---|---|---|---|---|---|---|
| 0 | Object | Planar | Infinity | | | | |
| 1 | Ape. Stop | Planar | −0.706 | | | | |
| 2 | Lens 1 | 1.848 ASP | 1.178 | Plastic | 1.545 | 56.1 | 3.44 |
| 3 | | 94.684 ASP | 0.061 | | | | |
| 4 | Lens 2 | 8.146 ASP | 0.245 | Plastic | 1.660 | 20.4 | −7.36 |
| 5 | | 3.005 ASP | 0.422 | | | | |
| 6 | Stop | Planar | 1.170 | | | | |
| 7 | Lens 3 | −8.788 ASP | 0.260 | Plastic | 1.544 | 56.0 | −7.30 |
| 8 | | 7.328 ASP | 0.218 | | | | |
| 9 | Stop | Planar | 1.002 | | | | |
| 10 | Lens 4 | −4.511 ASP | 0.619 | Plastic | 1.660 | 20.4 | 4.72 |
| 11 | | −1.943 ASP | 0.068 | | | | |
| 12 | Lens 5 | −1.338 ASP | 0.318 | Plastic | 1.544 | 56.0 | −4.82 |
| 13 | | −2.959 ASP | 0.300 | | | | |
| 14 | IR Cut Filter | Planar | 0.110 | Glass | 1.517 | 64.2 | — |
| 15 | | Planar | 0.414 | | | | |
| 16 | Image Surface | Planar | — | | | | |

* Reference wavelength is d-line 587.6 nm.
* The effective radius of Surface 6 is 1.035 mm.
* The effective radius of Surface 9 is 1.155 mm.

TABLE 16

Aspheric Coefficients

| Surface # | 2 | 3 | 4 | 5 | 7 |
|---|---|---|---|---|---|
| k = | −3.5376E−01 | 0.0000E+00 | −7.1586E+01 | −3.9095E+01 | −1.2326E+01 |
| A4 = | 2.6132E−03 | −1.4690E−01 | −1.7117E−01 | 1.1541E−01 | 4.3630E−02 |
| A6 = | 3.6044E−03 | 3.0849E−01 | 4.3820E−01 | −2.4429E−01 | −2.4755E−01 |
| A8 = | −4.5017E−03 | −2.9442E−01 | −4.4958E−01 | 4.5253E−02 | 6.6549E−01 |
| A10 = | 3.2541E−03 | 1.4787E−01 | 2.4505E−01 | −5.1790E−02 | −9.7090E−01 |
| A12 = | −9.2517E−04 | −3.8821E−02 | −6.9094E−02 | 2.5569E−02 | 6.7207E−01 |
| A14 = | | 4.1996E−03 | 8.2919E−03 | | −1.7929E−01 |

| Surface # | 8 | 10 | 11 | 12 | 13 |
|---|---|---|---|---|---|
| k = | 1.6476E+01 | 0.0000E+00 | −1.0000E+00 | −3.6760E+00 | −2.3447E+00 |
| A4 = | 8.4982E−02 | 1.6510E−02 | 1.9275E−01 | 2.0029E−01 | 4.9108E−02 |
| A6 = | −1.7662E−01 | −1.1341E−01 | −3.4303E−01 | −2.6652E−01 | 4.6666E−02 |
| A8 = | 4.4683E−01 | 1.3681E−01 | 2.5583E−01 | 1.3956E−01 | −9.6615E−02 |
| A10 = | −5.6878E−01 | −7.0290E−02 | −9.4100E−02 | −2.8654E−02 | 5.7986E−02 |
| A12 = | 3.4054E−01 | 1.7120E−02 | 1.7442E−02 | −8.0640E−04 | −1.7404E−02 |

TABLE 16-continued

| Aspheric Coefficients | | | | |
|---|---|---|---|---|
| A14 = | −7.7529E−02 | −1.6071E−03 | −1.3154E−03 | 1.2239E−03 | 2.6598E−03 |
| A16 = | | | | −1.3930E−04 | −1.6361E−04 |

In the 8th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 8th embodiment, so an explanation in this regard will not be provided again.

Moreover, these parameters can be calculated from TABLE 15 and TABLE 16 and satisfy the conditions stated in table below.

| 8th Embodiment | | | |
|---|---|---|---|
| f [mm] | 7.51 | TL/BL | 7.75 |
| Fno | 2.48 | TL/f | 0.85 |
| HFOV [deg.] | 15.0 | TL/ImgH | 3.13 |
| (V2 + V4)/V1 | 0.73 | (R3 − R4)/(R3 + R4) | 0.46 |
| V4 | 20.4 | (R9 + R10)/(R9 − R10) | −2.65 |
| BL/T23 | 0.52 | f/f1 | 2.18 |
| SL/TL | 0.89 | f/f3 | −1.03 |
| T12/CT1 | 0.05 | f/ImgH | 3.68 |
| T23/T34 | 1.30 | f/R1 | 4.06 |
| T45/CT5 | 0.21 | |f2/f5| | 1.52 |
| TD/T23 | 3.49 | |Sag11/f1| | 0.21 |
| TL [mm] | 6.39 | Y52/Y11 | 1.23 |

9th Embodiment

Figure 9A:
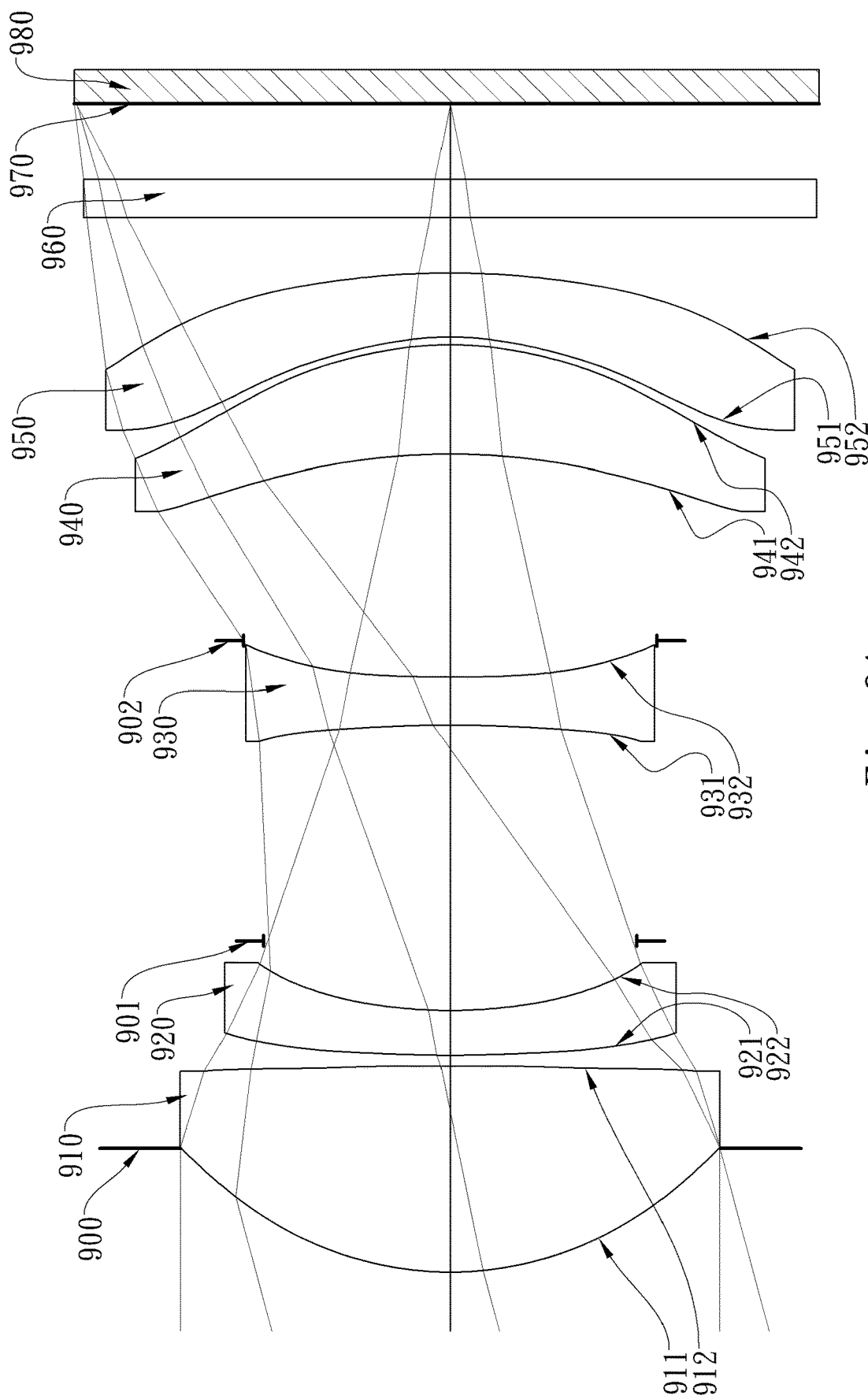
FIG. 9A is a schematic view of an imaging apparatus according to the 9th embodiment of the present disclosure.
Figure 9B:
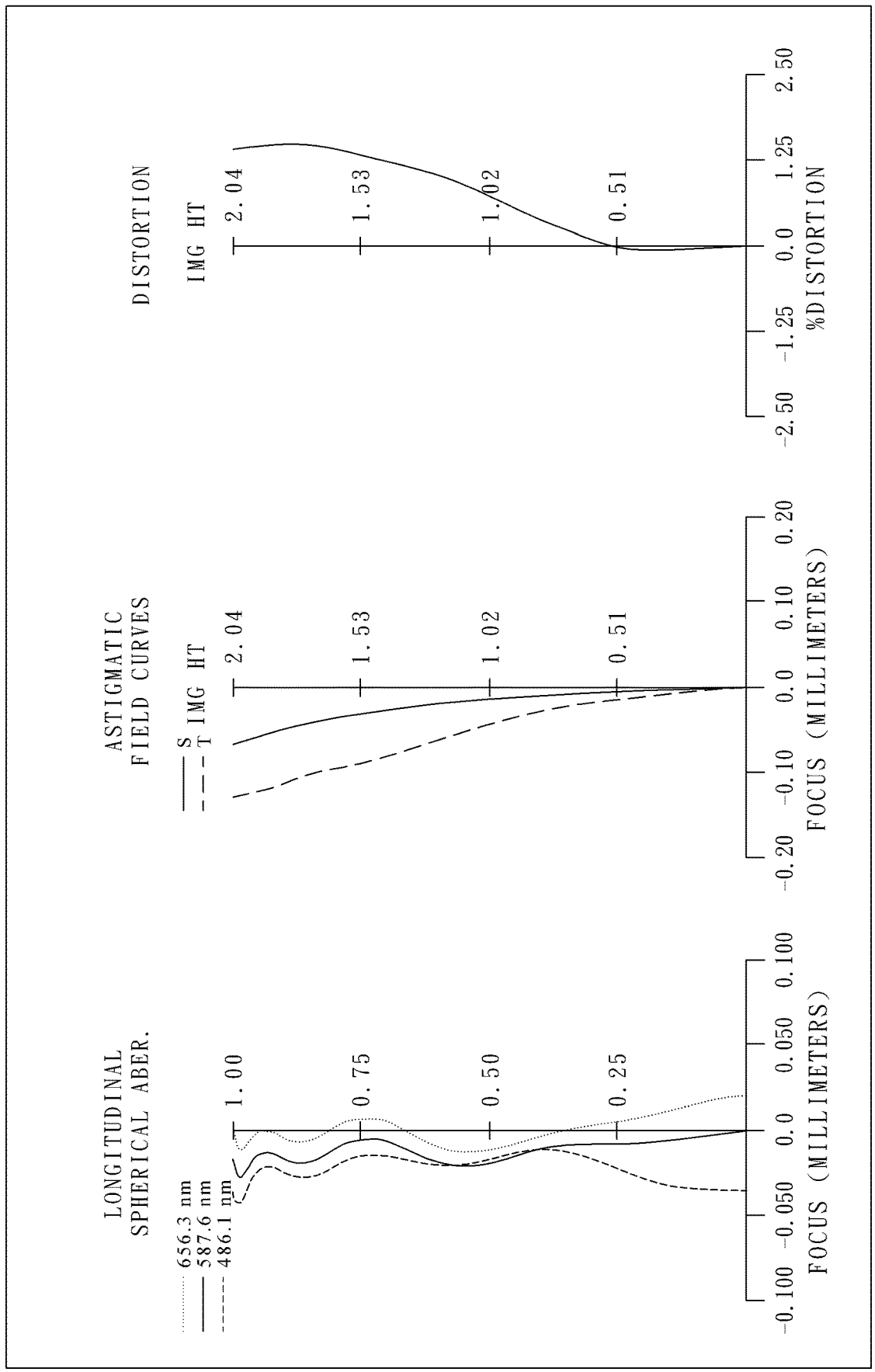
FIG. 9B shows longitudinal spherical aberration curves, astigmatic field curves and a distortion curve of the imaging apparatus according to the 9th embodiment.

FIG. 9A is a schematic view of an imaging apparatus according to the 9th embodiment of the present disclosure. FIG. 9B shows, in order from left to right, longitudinal spherical aberration curves, astigmatic field curves and a distortion curve of the imaging apparatus according to the 9th embodiment.

In FIG. 9A, the imaging apparatus includes an image system lens assembly (not otherwise herein labeled) of the present disclosure and an image sensor 980. The image system lens assembly includes five lens elements, the five lens elements being, in order from an object side to an image side, a first lens element 910, a second lens element 920, a third lens element 930, a fourth lens element 940, and a fifth lens element 950. Any two adjacent lens elements of the first lens element 910, the second lens element 920, the third lens element 930, the fourth lens element 940, and the fifth lens element 950 have an air gap on an optical axis there between and no other lens elements are inserted there between.

The first lens element 910 with positive refractive power has an object-side surface 911 being convex in a paraxial region thereof, an image-side surface 912 being concave in a paraxial region thereof, and both the object-side surface 911 and the image-side surface 912 being aspheric. The first lens element 910 is made of plastic material.

The second lens element 920 with negative refractive power has an object-side surface 921 being convex in a paraxial region thereof, an image-side surface 922 being concave in a paraxial region thereof, and both the object-side surface 921 and the image-side surface 922 being aspheric. The second lens element 920 is made of plastic material.

The third lens element 930 with negative refractive power has an object-side surface 931 being concave in a paraxial region thereof, an image-side surface 932 being concave in a paraxial region thereof, and both the object-side surface 931 and the image-side surface 932 being aspheric. The third lens element 930 is made of plastic material.

The fourth lens element 940 with positive refractive power has an object-side surface 941 being concave in a paraxial region thereof, an image-side surface 942 being convex in a paraxial region thereof, and both the object-side surface 941 and the image-side surface 942 being aspheric. The fourth lens element 940 is made of plastic material.

The fifth lens element 950 with negative refractive power has an object-side surface 951 being concave in a paraxial region thereof, an image-side surface 952 being convex in a paraxial region thereof, both the object-side surface 951 and the image-side surface 952 being aspheric, and at least one inflection point on both the object-side surface 951 and the image-side surface 952 thereof. The fifth lens element 950 is made of plastic material.

The image system lens assembly further includes an aperture stop 900 disposed at an object side of the first lens element 910, a stop 901 disposed between the second lens element 920 and the third lens element 930, a stop 902 disposed between the third lens element 930 and the fourth lens element 940, and an IR cut filter 960 disposed between the fifth lens element 950 and an image surface 970. The IR cut filter 960 is made of glass material and will not affect the focal length of the image system lens assembly. The image sensor 980 is disposed on or near the image surface 970 of the image system lens assembly.

The detailed optical data of the 9th embodiment are shown in TABLE 17, and the aspheric surface data are shown in TABLE 18.

TABLE 17

(9th Embodiment)
f = 7.51 mm, Fno = 2.55, HFOV = 15.0 deg.

| Surface # | | Curvature Radius | Thickness | Material | Index | Abbe # | Focal Length |
|---|---|---|---|---|---|---|---|
| 0 | Object | Planar | Infinity | | | | |
| 1 | Ape. Stop | Planar | −0.676 | | | | |
| 2 | Lens 1 | 1.835 ASP | 1.125 | Plastic | 1.545 | 56.1 | 3.44 |
| 3 | | 65.344 ASP | 0.059 | | | | |
| 4 | Lens 2 | 5.246 ASP | 0.245 | Plastic | 1.660 | 20.4 | −7.54 |
| 5 | | 2.506 ASP | 0.382 | | | | |
| 6 | Stop | Planar | 1.179 | | | | |

TABLE 17-continued (9th Embodiment)
f = 7.51 mm, Fno = 2.55, HFOV = 15.0 deg.

| Surface # | | Curvature Radius | | Thickness | Material | Index | Abbe # | Focal Length |
|---|---|---|---|---|---|---|---|---|
| 7 | Lens 3 | −6.598 | ASP | 0.260 | Plastic | 1.544 | 56.0 | −7.27 |
| 8 | | 9.995 | ASP | 0.199 | | | | |
| 9 | Stop | Planar | | 1.021 | | | | |
| 10 | Lens 4 | −3.576 | ASP | 0.598 | Plastic | 1.660 | 20.4 | 4.70 |
| 11 | | −1.772 | ASP | 0.043 | | | | |
| 12 | Lens 5 | −1.594 | ASP | 0.350 | Plastic | 1.544 | 56.0 | −4.74 |
| 13 | | −4.506 | ASP | 0.300 | | | | |
| 14 | IR Cut Filter | Planar | | 0.210 | Glass | 1.517 | 64.2 | — |
| 15 | | Planar | | 0.414 | | | | |
| 16 | Image Surface | Planar | | — | | | | |

* Reference wavelength is d-line 587.6 nm.
* The effective radius of Surface 6 is 1.020 mm.
* The effective radius of Surface 9 is 1.130 mm.

TABLE 18

Aspheric Coefficients

| Surface # | 2 | 3 | 4 | 5 | 7 |
|---|---|---|---|---|---|
| k = | −3.4695E−01 | 0.0000E+00 | −6.4598E+01 | −2.8939E+01 | 0.0000E+00 |
| A4 = | 4.0360E−03 | −1.7687E−01 | −2.0644E−01 | 1.0424E−01 | 7.7661E−02 |
| A6 = | 7.0560E−04 | 3.8872E−01 | 5.5998E−01 | 2.6633E−02 | −2.1547E−01 |
| A8 = | −1.9358E−03 | −3.9780E−01 | −6.2871E−01 | −4.4540E−02 | 4.8194E−01 |
| A10 = | 2.4019E−03 | 2.1801E−01 | 3.7397E−01 | 1.0963E−02 | −7.0421E−01 |
| A12 = | −8.3922E−04 | −6.2689E−02 | −1.1408E−01 | 1.0025E−02 | 4.8830E−01 |
| A14 = | | 7.4211E−03 | 1.4378E−02 | | −1.2820E−01 |

| Surface # | 8 | 10 | 11 | 12 | 13 |
|---|---|---|---|---|---|
| k = | 3.7593E+01 | 0.0000E+00 | −1.0000E+00 | −7.3957E+00 | 0.0000E+00 |
| A4 = | 1.2882E−01 | 1.6977E−02 | 1.8405E−01 | 5.9523E−02 | −9.9955E−03 |
| A6 = | −1.6492E−01 | −6.1183E−02 | −3.0600E−01 | −1.3188E−01 | 5.5443E−02 |
| A8 = | 3.2939E−01 | 8.9245E−02 | 2.3867E−01 | 4.9605E−02 | −7.8377E−02 |
| A10 = | −4.0570E−01 | −5.6586E−02 | −9.6055E−02 | 1.8474E−02 | 4.6462E−02 |
| A12 = | 2.3581E−01 | 1.6560E−02 | 1.9894E−02 | −1.6949E−02 | −1.4254E−02 |
| A14 = | −5.0070E−02 | −1.7943E−03 | −1.6783E−03 | 4.2391E−03 | 2.2234E−03 |
| A16 = | | | | −3.6979E−04 | −1.3832E−04 |

In the 9th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 9th embodiment, so an explanation in this regard will not be provided again.

Moreover, these parameters can be calculated from TABLE 17 and TABLE 18 and satisfy the conditions stated in table below.

| 9th Embodiment | | | |
|---|---|---|---|
| f [mm] | 7.51 | TL/BL | 6.91 |
| Fno | 2.55 | TL/f | 0.85 |
| HFOV [deg.] | 15.0 | TL/ImgH | 3.13 |
| (V2 + V4)/V1 | 0.73 | (R3 − R4)/(R3 + R4) | 0.35 |
| V4 | 20.4 | (R9 + R10)/(R9 − R10) | −2.10 |
| BL/T23 | 0.59 | f/f1 | 2.18 |
| SL/TL | 0.89 | f/f3 | −1.03 |
| T12/CT1 | 0.05 | f/ImgH | 3.68 |
| T23/T34 | 1.28 | f/R1 | 4.09 |
| T45/CT5 | 0.12 | |f2/f5| | 1.59 |
| TD/T23 | 3.50 | |Sag11/f1| | 0.20 |
| TL [mm] | 6.38 | Y52/Y11 | 1.28 |

10th Embodiment

Figure 10A:
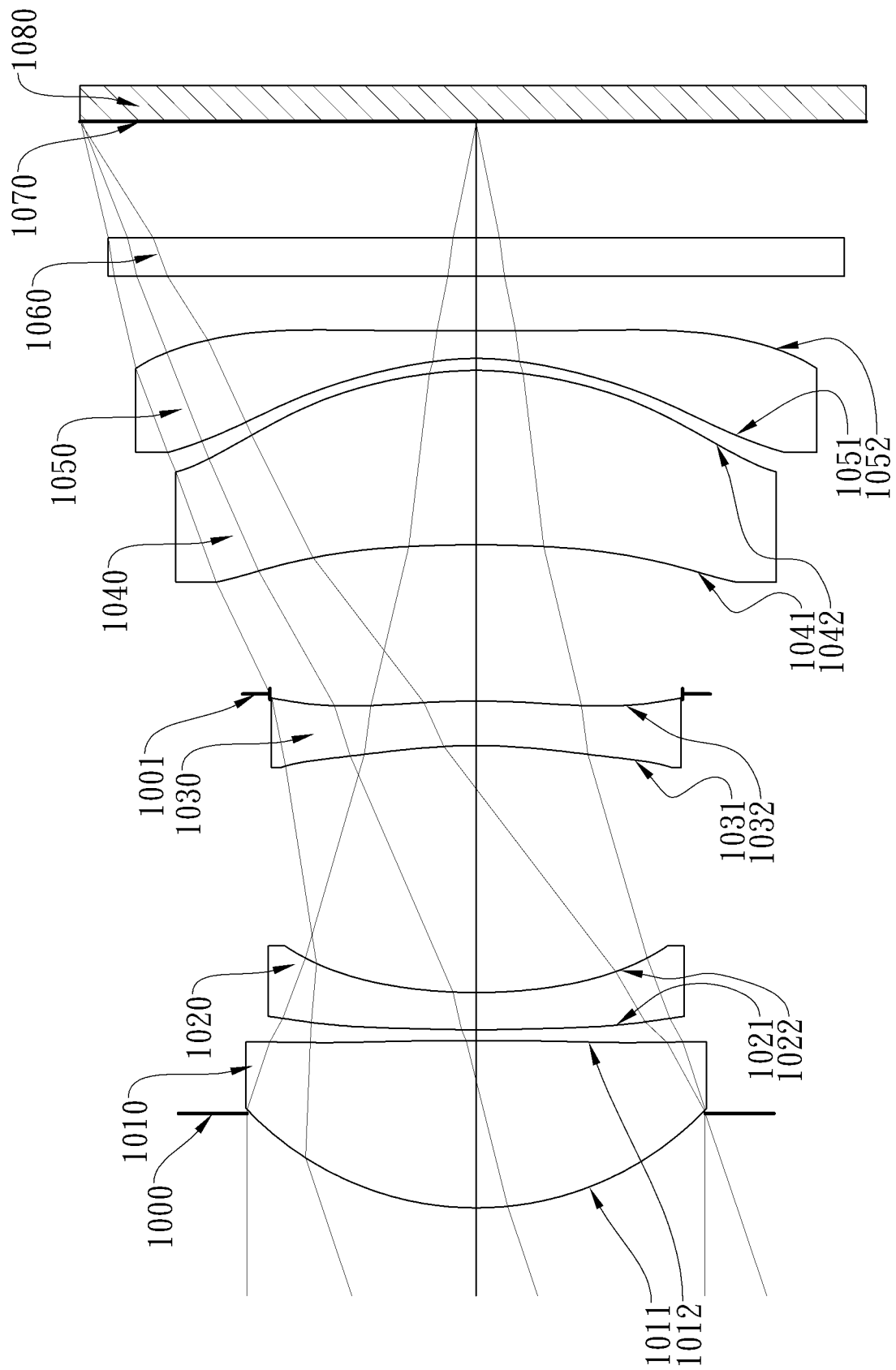
FIG. 10A is a schematic view of an imaging apparatus according to the 10th embodiment of the present disclosure.
Figure 10B:
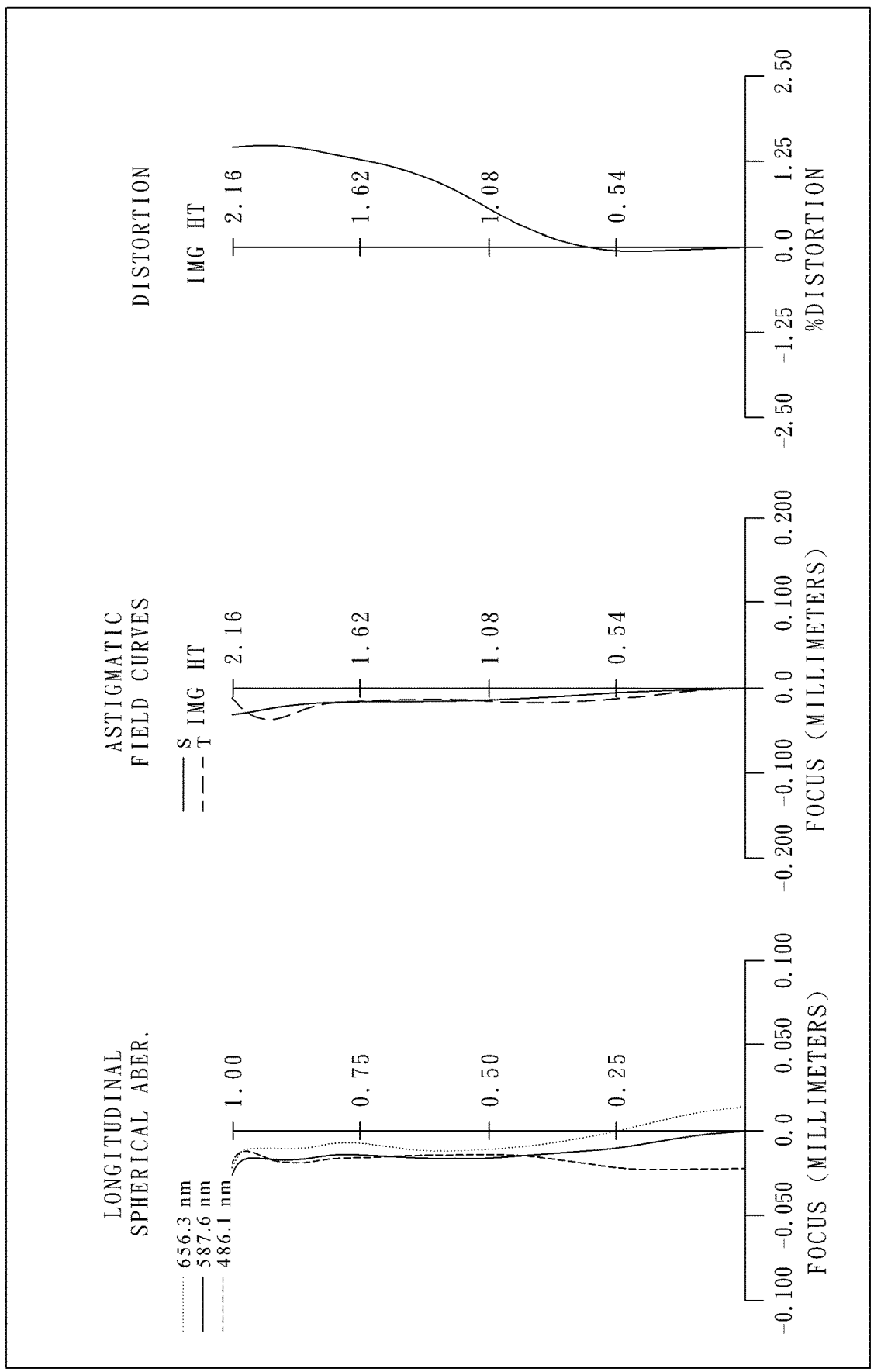
FIG. 10B shows longitudinal spherical aberration curves, astigmatic field curves and a distortion curve of the imaging apparatus according to the 10th embodiment.

FIG. 10A is a schematic view of an imaging apparatus according to the 10th embodiment of the present disclosure. FIG. 10B shows, in order from left to right, longitudinal spherical aberration curves, astigmatic field curves and a distortion curve of the imaging apparatus according to the 10th embodiment.

In FIG. 10A, the imaging apparatus includes an image system lens assembly (not otherwise herein labeled) of the present disclosure and an image sensor 1080. The image system lens assembly includes five lens elements, the five lens elements being, in order from an object side to an image side, a first lens element 1010, a second lens element 1020, a third lens element 1030, a fourth lens element 1040, and a fifth lens element 1050. Any two adjacent lens elements of the first lens element 1010, the second lens element 1020, the third lens element 1030, the fourth lens element 1040, and the fifth lens element 1050 have an air gap on an optical axis there between and no other lens elements are inserted there between.

The first lens element 1010 with positive refractive power has an object-side surface 1011 being convex in a paraxial region thereof, an image-side surface 1012 being concave in a paraxial region thereof, and both the object-side surface 1011 and the image-side surface 1012 being aspheric. The first lens element 1010 is made of plastic material.

The second lens element 1020 with negative refractive power has an object-side surface 1021 being convex in a paraxial region thereof, an image-side surface 1022 being concave in a paraxial region thereof, and both the object-side surface 1021 and the image-side surface 1022 being aspheric. The second lens element 1020 is made of plastic material.

The third lens element 1030 with negative refractive power has an object-side surface 1031 being concave in a paraxial region thereof, an image-side surface 1032 being convex in a paraxial region thereof, and both the object-side surface 1031 and the image-side surface 1032 being aspheric. The third lens element 1030 is made of plastic material.

The fourth lens element 1040 with positive refractive power has an object-side surface 1041 being concave in a paraxial region thereof, an image-side surface 1042 being convex in a paraxial region thereof, and both the object-side surface 1041 and the image-side surface 1042 being aspheric. The fourth lens element 1040 is made of plastic material.

The fifth lens element 1050 with negative refractive power has an object-side surface 1051 being concave in a paraxial region thereof, an image-side surface 1052 being concave in a paraxial region thereof, both the object-side surface 1051 and the image-side surface 1052 being aspheric, and at least one inflection point on both the object-side surface 1051 and the image-side surface 1052 thereof. The fifth lens element 1050 is made of plastic material.

The image system lens assembly further includes an aperture stop 1000 disposed at an object side of the first lens element 1010, a stop 1001 disposed between the third lens element 1030 and the fourth lens element 1040, and an IR cut filter 1060 disposed between the fifth lens element 1050 and an image surface 1070. The IR cut filter 1060 is made of glass material and will not affect the focal length of the image system lens assembly. The image sensor 1080 is disposed on or near the image surface 1070 of the image system lens assembly.

The detailed optical data of the 10th embodiment are shown in TABLE 19, and the aspheric surface data are shown in TABLE 20.

TABLE 19

(10th Embodiment)
f = 6.35 mm, Fno = 2.53, HFOV = 18.6 deg.

| Surface # | | Curvature Radius | Thickness | Material | Index | Abbe # | Focal Length |
|---|---|---|---|---|---|---|---|
| 0 | Object | Planar | Infinity | | | | |
| 1 | Ape. Stop | Planar | −0.518 | | | | |
| 2 | Lens 1 | 1.714 ASP | 0.915 | Plastic | 1.545 | 56.0 | 3.24 |
| 3 | | 49.740 ASP | 0.061 | | | | |
| 4 | Lens 2 | 7.036 ASP | 0.204 | Plastic | 1.642 | 22.5 | −7.18 |
| 5 | | 2.752 ASP | 1.354 | | | | |
| 6 | Lens 3 | −3.091 ASP | 0.244 | Plastic | 1.559 | 40.4 | −20.31 |
| 7 | | −4.368 ASP | 0.038 | | | | |
| 8 | Stop | Planar | 0.818 | | | | |
| 9 | Lens 4 | −7.790 ASP | 0.956 | Plastic | 1.669 | 19.5 | 3.40 |
| 10 | | −1.846 ASP | 0.066 | | | | |
| 11 | Lens 5 | −1.599 ASP | 0.150 | Plastic | 1.584 | 28.2 | −2.62 |
| 12 | | 38.390 ASP | 0.300 | | | | |
| 13 | IR Cut Filter | Planar | 0.210 | Glass | 1.517 | 64.2 | — |
| 14 | | Planar | 0.639 | | | | |
| 15 | Image Surface | Planar | — | | | | |

\* Reference wavelength is d-line 587.6 nm.
\* The effective radius of Surface 8 is 1.130 mm.

TABLE 20

Aspheric Coefficients

| Surface # | 2 | 3 | 4 | 5 | 6 |
|---|---|---|---|---|---|
| k = | −3.1623E−01 | 8.9399E+01 | −5.7122E+01 | −2.9337E+01 | −7.2428E+00 |
| A4 = | 4.3876E−03 | −1.7371E−01 | −2.0649E−01 | 1.0766E−01 | 9.2855E−02 |
| A6 = | 2.4314E−03 | 3.9094E−01 | 5.5932E−01 | 3.4998E−02 | −1.7867E−01 |
| A8 = | −8.6537E−04 | −3.9817E−01 | −6.2710E−01 | −4.6628E−02 | 4.9761E−01 |
| A10 = | 2.5289E−03 | 2.1777E−01 | 3.7128E−01 | 5.1035E−03 | −7.3072E−01 |
| A12 = | −7.7656E−04 | −6.2082E−02 | −1.1564E−01 | 1.0060E−02 | 4.8818E−01 |
| A14 = | | 6.9679E−03 | 1.4834E−02 | | −1.2830E−01 |

| Surface # | 7 | 9 | 10 | 11 | 12 |
|---|---|---|---|---|---|
| k = | −5.9293E+00 | 2.5302E+01 | −9.8778E−01 | −7.1371E+00 | −8.4302E+01 |
| A4 = | 1.3043E−01 | −3.4833E−03 | 1.8653E−01 | 7.1085E−02 | −2.0391E−02 |
| A6 = | −1.2494E−01 | −6.8828E−02 | −3.0877E−01 | −1.3211E−01 | 5.6314E−02 |
| A8 = | 3.3424E−01 | 9.3824E−02 | 2.3812E−01 | 4.8101E−02 | −7.8677E−02 |
| A10 = | −4.2188E−01 | −5.6066E−02 | −9.5771E−02 | 1.8200E−02 | 4.6596E−02 |
| A12 = | 2.3592E−01 | 1.6484E−02 | 2.0012E−02 | −1.6885E−02 | −1.4247E−02 |

TABLE 20-continued

| Aspheric Coefficients | | | | | |
|---|---|---|---|---|---|
| A14 = | −4.9974E−02 | −1.6554E−03 | −1.6932E−03 | 4.2643E−03 | 2.2164E−03 |
| A16 = | | | | −3.7338E−04 | −1.3999E−04 |

In the 10th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 10th embodiment, so an explanation in this regard will not be provided again.

Moreover, these parameters can be calculated from TABLE 19 and TABLE 20 and satisfy the conditions stated in table below.

| 10th Embodiment | | | |
|---|---|---|---|
| f [mm] | 6.35 | TL/BL | 5.18 |
| Fno | 2.53 | TL/f | 0.94 |
| HFOV [deg.] | 18.6 | TL/ImgH | 2.76 |
| (V2 + V4)/V1 | 0.75 | (R3 − R4)/(R3 + R4) | 0.44 |
| V4 | 19.5 | (R9 + R10)/(R9 − R10) | −0.92 |
| BL/T23 | 0.85 | f/f1 | 1.96 |
| SL/TL | 0.91 | f/f3 | −0.31 |
| T12/CT1 | 0.07 | f/ImgH | 2.94 |
| T23/T34 | 1.58 | f/R1 | 3.70 |
| T45/CT5 | 0.44 | |f2/f5| | 2.74 |
| TD/T23 | 3.55 | |Sag11/f1| | 0.17 |
| TL [mm] | 5.95 | Y52/Y11 | 1.48 |

11th Embodiment

Figure 12:
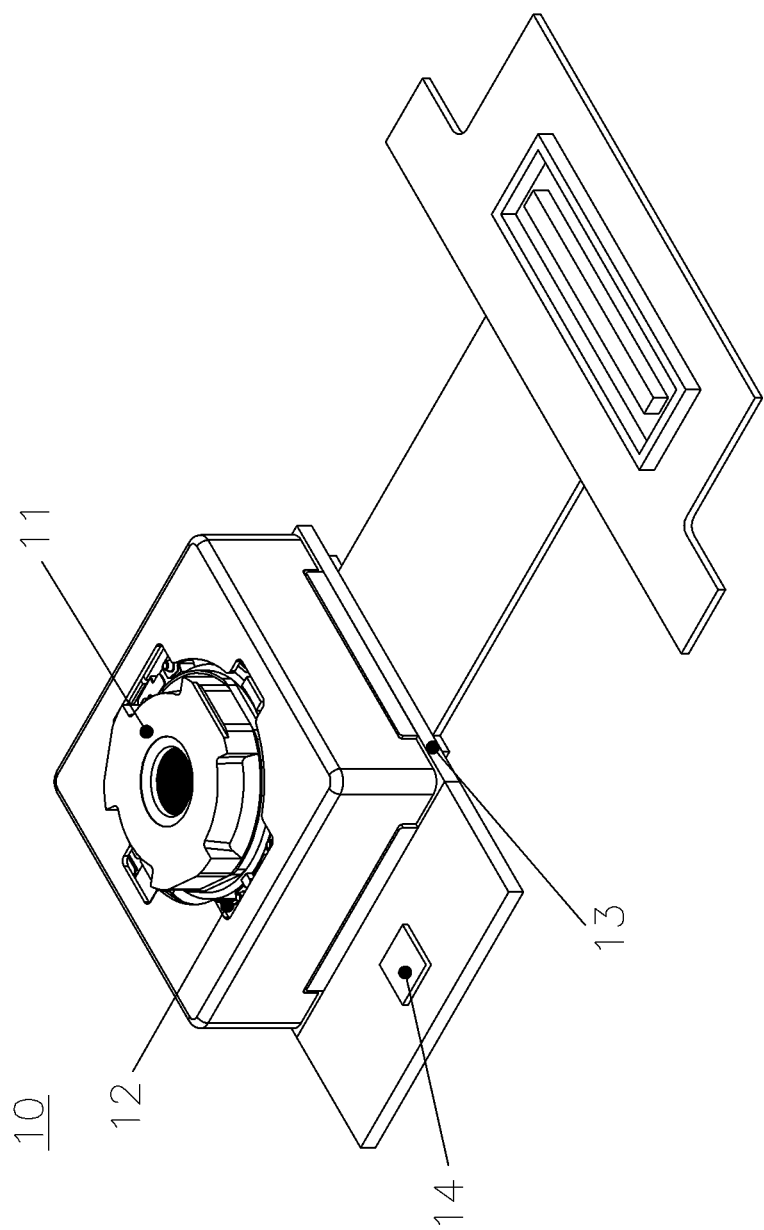
FIG. 12 is a 3-dimensional schematic view of an imaging apparatus according to the 11th embodiment of the present disclosure.

FIG. 12 is a 3-dimensional schematic view of an imaging apparatus 10 according to the 11th embodiment of the present disclosure. In the present embodiment, the imaging apparatus 10 is a camera module. The imaging apparatus 10 includes a lens unit 11, a driving device 12, and an image sensor 13. The lens unit 11 includes the image system lens assembly of the 1st embodiment described above and a lens barrel (not otherwise herein labeled) for carrying the image system lens assembly. The imaging apparatus 10 retrieves light and generates an image by using the lens unit 11, using the driving device 12 to adjust the focus to photograph on the image sensor 13 and outputs the image data thereafter.

The driving device 12 may be an auto-focus model that can be driven by a voice coil motor (VCM), a micro electro-mechanical system (MEMS), a piezoelectric system, shape memory metal or other driving systems. The driving device 12 allows the lens unit 11 to obtain a better imaging position, providing a clear image wherever an imaged object 30 (Please refer to FIG. 13B) being positioned with different object distances.

The imaging apparatus 10 may be configured to equip the image sensor 13 (e.g., CMOS, CCD) with high sensitivity and low noise on the image surface of the image system lens assembly to truly provide the satisfactory image quality obtained from the image system lens assembly.

In addition, the imaging apparatus 10 may further include an image stabilizer 14, which may be a dynamic sensing element such as accelerometer, a gyroscope or a Hall effect sensor. The image stabilizer 14 in the 11th embodiment is a gyroscope but not limited. By adjusting the image system lens assembly in different axial directions to provide a compensation for image blurs due to motion during exposures, the image quality under dynamic and low-light circumstances can be further improved and enhanced image compensation functions such as optical image stabilization (OIS) or electronic image stabilization (EIS) can also be provided.

12th Embodiment

Figure 13A:
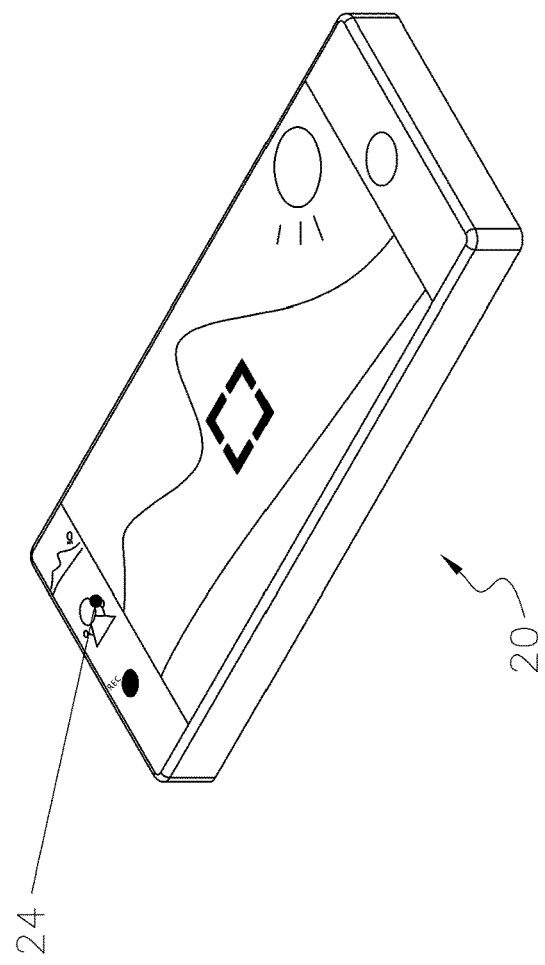
FIG. 13A is a 3-dimensional schematic view of an electronic device according to the 12th embodiment of the present disclosure.
Figure 13A:
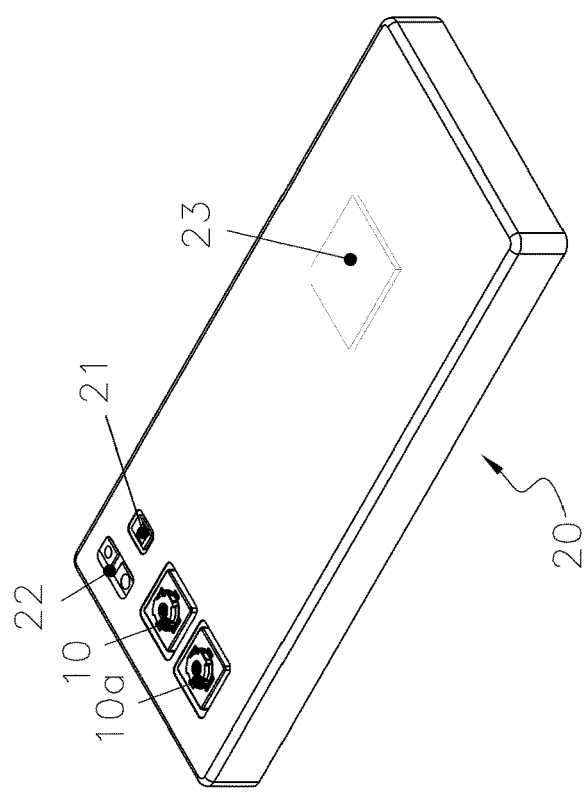
Figure 13B:
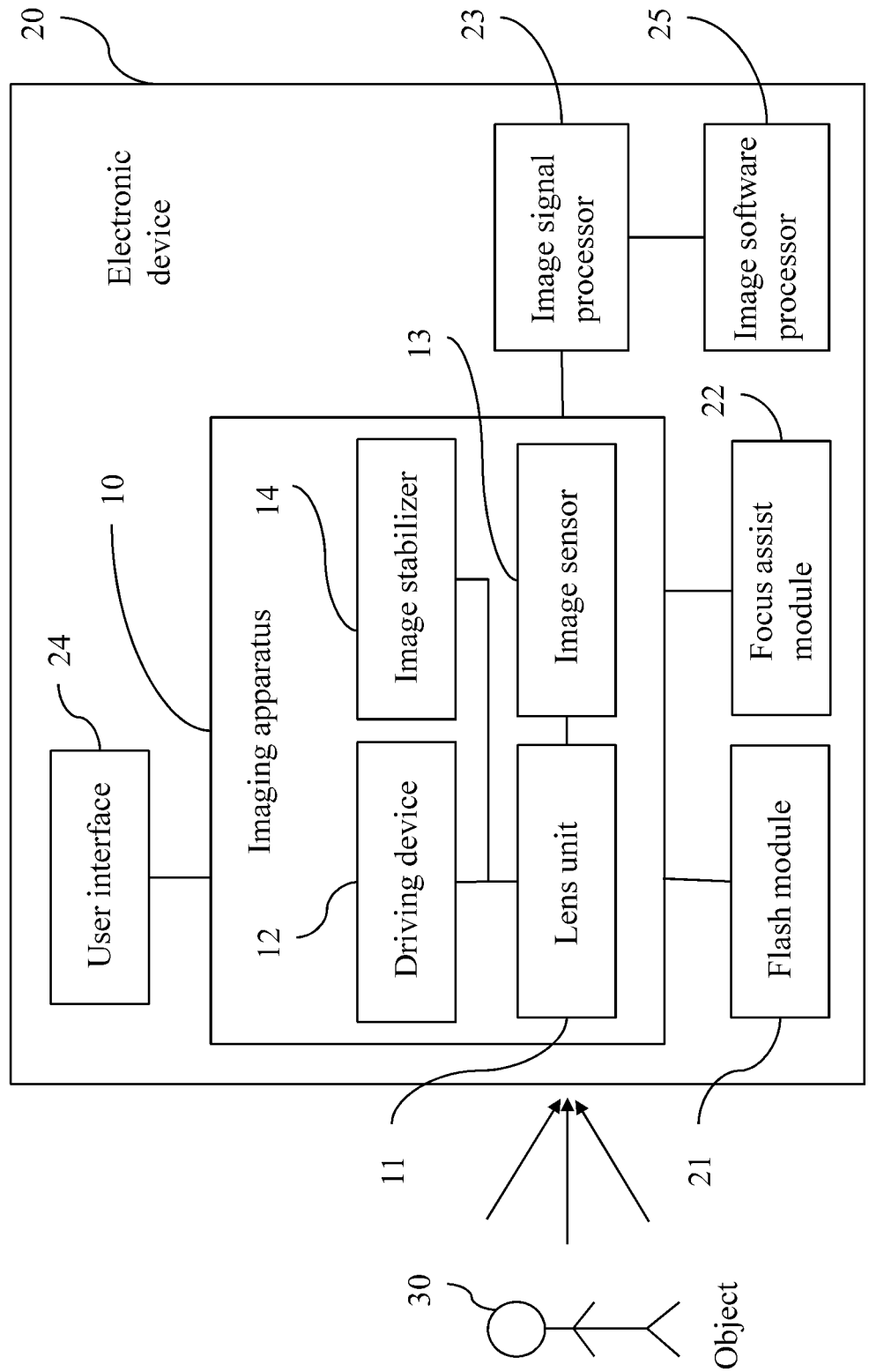
FIG. 13B is a schematic view of the electronic device according to the 12th embodiment of the present disclosure.

Please refer to FIG. 13A and FIG. 13B. FIG. 13A is a 3-dimensional schematic view of an electronic device 20 according to the 12th embodiment of the present disclosure. FIG. 13B is a schematic view of the electronic device 20 shown in the FIG. 13A. In the present embodiment, the electronic device 20 is a smart phone. The electronic device 20 includes the imaging apparatus 10 of the 11th embodiment, an imaging apparatus 10a, a flash module 21, a focus assist module 22, an image signal processor 23, a user interface 24, and an image software processor 25 (Please refer to FIG. 13B). In the present disclosure, the imaging apparatus 10 is a lens unit with small field of view and the imaging apparatus 10a is a lens unit with wide field of view but not limited. For example, two imaging apparatuses 10 and 10a may both be lens units with small field of view. Besides, the electronic device 20 in the present embodiment includes two imaging apparatuses 10 and 10a as an exemplary but not limited. For example, the electronic device 20 may include only one imaging apparatus 10 or may include more than two imaging apparatuses.

When a user utilizes the user interface 24 to capture images of the object 30 (Please refer to FIG. 13B), the electronic device 20 retrieves the light and captures an image via at least one of the imaging apparatuses 10 and 10a, triggering the flash module 21 to compensate insufficient light level, and focuses instantly according to the distance information of the object 30 provided by the focus assist module 22. The images are further optimized by the image signal processor 23 to further enhance the image quality generated by the image system lens assembly. The focus assist module 22 may adopt an infrared ray or laser focus assist system to achieve quick focusing. The user interface 24 may use a touch screen or a physical shooting button cooperated with various functions of the image software processor 25 to perform image capturing and image processing.

The imaging apparatus 10 of the present disclosure is not limited to be applied to the smart phone. The imaging apparatus 10 may be used in a system of moving focus and features in both excellent aberration correction and satisfactory image quality. For example, the imaging apparatus 10 may be applied to a variety of applications such as car electronics, drones, smart electronic products, tablet computers, wearable devices, medical devices, precision instruments, surveillance cameras, portable video recorders, identification systems, multi-lens devices, somatosensory detections, virtual realities, motion devices, home intelligent auxiliary systems and other electronic devices. The aforementioned electronic apparatus is merely exemplary of practical use of the present disclosure and does not limit the scope of application of the imaging apparatus of the present disclosure.

The aforementioned exemplary figures of different electronic devices are only exemplary for showing the imaging apparatus of the present disclosure installed in an electronic device, and the present disclosure is not limited thereto. Preferably, the electronic device can further include a control unit, a display unit, a storage unit, a random access memory unit (RAM) or a combination thereof.

The foregoing description, for purpose of explanation, has been described with reference to specific embodiments. It is to be noted that TABLES 1-20 show different data of the different embodiments; however, the data of the different embodiments are obtained from experiments. The embodiments were chosen and described in order to best explain the principles of the disclosure and its practical applications, and thereby to enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image system lens assembly, comprising five lens elements, the five lens elements being, in order from an object side to an image side:
   a first lens element;
   a second lens element having an object side-surface being convex in a paraxial region thereof;
   a third lens element having negative refractive power;
   a fourth lens element with positive refractive power having an image-side surface being convex in a paraxial region thereof; and
   a fifth lens element having negative refractive power,
   wherein an axial distance between an image-side surface of the fifth lens element and an image surface is BL, an axial distance between the second lens element and the third lens element is T23, an axial distance between the third lens element and the fourth lens element is T34, an axial distance between an object-side surface of the first lens element and the image surface is TL, a focal length of the image system lens assembly is f, a maximum image height of the image system lens assembly is ImgH, an Abbe number of the fourth lens element is V4, and the following conditions are satisfied:

$0.10 < BL/T23 < 1.20$;

$0.10 < T23/T34 < 7.5$;

$0 < TL/f < 1.0$;

$2.0 < TL/ImgH < 3.7$; and $V4 < 40$.

2. The image system lens assembly of claim 1, wherein the axial distance between the image-side surface of the fifth lens element and the image surface is BL, the axial distance between the second lens element and the third lens element is T23, and the following condition is satisfied:

$0.30 < BL/T23 < 1.0$.

3. The image system lens assembly of claim 1, wherein the axial distance between the second lens element and the third lens element is T23, the axial distance between the third lens element and the fourth lens element is T34, and the following condition is satisfied:

$1.1 < T23/T34 < 3.5$.

4. The image system lens assembly of claim 1, an axial distance between the object-side surface of the first lens element and the image-side surface of the fifth lens element is TD, the axial distance between the second lens element and the third lens element is T23, and the following condition is satisfied:

$1.8 < TD/T23 < 4.0$.

5. The image system lens assembly of claim 1, wherein a curvature radius of the object-side surface of the second lens element is R3, a curvature radius of an image-side surface of the second lens element is R4, the focal length of the image system lens assembly is f, the maximum image height of the image system lens assembly is ImgH, and the following conditions are satisfied:

$0 < (R3-R4)/(R3+R4) < 1.0$;

$2.0 < f/ImgH < 4.2$.

6. The image system lens assembly of claim 1, further comprising an aperture stop being disposed at an object side of the first lens element, wherein an f-number of the image system lens assembly is Fno, an axial distance between the aperture stop and the image surface is SL, the axial distance between the object-side surface of the first lens element and the image surface is TL, and the following conditions are satisfied:

$2.0 < Fno < 2.8$;

$0.87 < SL/TL < 0.95$.

7. An image system lens assembly, comprising five lens elements, the five lens elements being, in order from an object side to an image side:
   a first lens element having positive refractive power;
   a second lens element with negative refractive power having an object side-surface being convex in a paraxial region thereof;
   a third lens element;
   a fourth lens element having positive refractive power; and
   a fifth lens element,
   wherein an axial distance between an image-side surface of the fifth lens element and an image surface is BL, an axial distance between the second lens element and the third lens element is T23, an axial distance between the third lens element and the fourth lens element is T34, an axial distance between the fourth lens element and the fifth lens element is T45, an axial distance between an object-side surface of the first lens element and the image surface is TL, a focal length of the image system lens assembly is f, a central thickness of the fifth lens element is CT5, and the following conditions are satisfied:

$0.10 < BL/T23 < 1.20$;

$0.10 < T23/T34 < 5.8$;

$0 < TL/f < 1.0$;

$0 < T45/CT5 < 0.57$.

8. The image system lens assembly of claim 7, wherein the axial distance between the image-side surface of the fifth lens element and the image surface is BL, the axial distance between the second lens element and the third lens element is T23, and the following condition is satisfied:

$0.30<BL/T23<1.0$.

9. The image system lens assembly of claim 7, wherein an Abbe number of the first lens element is V1, an Abbe number of the second lens element is V2, an Abbe number of the fourth lens element is V4, and the following condition is satisfied:

$0.20<(V2+V4)/V1<1.0$.

10. The image system lens assembly of claim 7, an axial distance between the object-side surface of the first lens element and the image-side surface of the fifth lens element is TD, the axial distance between the second lens element and the third lens element is T23, and the following condition is satisfied:

$1.8<TD/T23<4.0$.

11. The image system lens assembly of claim 7, wherein the axial distance between the object-side surface of the first lens element and the image surface is TL, half of a maximal field of view of the image system lens assembly is HFOV, and the following conditions are satisfied:

$TL<6.5$ mm;

$10°<HFOV<28°$.

12. The image system lens assembly of claim 7, wherein the fourth lens element has an image-side surface being convex in a paraxial region thereof, the axial distance between the object-side surface of the first lens element and the image surface is TL, the axial distance between the image-side surface of the fifth lens element and the image surface is BL, and the following condition is satisfied:

$4.8<TL/BL<10$.

13. The image system lens assembly of claim 7, wherein any two adjacent lens elements of the first lens element, the second lens element, the third lens element, the fourth lens element, and the fifth lens element have an air gap on an optical axis, each of the first lens element, the second lens element, the third lens element, the fourth lens element, and the fifth lens element has at least one surface being aspheric, the fifth lens element has at least one inflection point on at least one of an object-side surface and the image-side surface thereof, a distance in parallel with the optical axis from a center of the object-side surface of the first lens element to a maximum effective diameter position on the object-side surface of the first lens element is Sag11, a focal length of the first lens element is f1, and the following condition is satisfied:

$0.15<|Sag11/f1|<0.30$.

14. An image system lens assembly, comprising five lens elements, the five lens elements being, in order from an object side to an image side:
   a first lens element having an object-side surface being convex in a paraxial region;
   a second lens element with negative refractive power having an object side-surface being convex in a paraxial region thereof;
   a third lens element;
   a fourth lens element having positive refractive power; and
   a fifth lens element,
   wherein an axial distance between an image-side surface of the fifth lens element and an image surface is BL, an axial distance between the first lens element and the second lens element is T12, an axial distance between the second lens element and the third lens element is T23, an axial distance between the third lens element and the fourth lens element is T34, an axial distance between the object-side surface of the first lens element and the image surface is TL, a focal length of the image system lens assembly is f, a central thickness of the first lens element is CT1, a vertical distance between a maximum effective diameter position on the object-side surface of the first lens element and an optical axis is Y11, a vertical distance between a maximum effective diameter position on the image-side surface of the fifth lens element and the optical axis is Y52, and the following conditions are satisfied:

$0.10<BL/T23<1.20$;

$0.65<T23/T34<5.8$;

$0<TL/f<1.0$;

$0<T12/CT1<0.43$; and $1.0<Y52/Y11<1.8$.

15. The image system lens assembly of claim 14, wherein the axial distance between the image-side surface of the fifth lens element and the image surface is BL, the axial distance between the second lens element and the third lens element is T23, and the following condition is satisfied:

$0.30<BL/T23<1.0$.

16. The image system lens assembly of claim 14, wherein the axial distance between the second lens element and the third lens element is T23, the axial distance between the third lens element and the fourth lens element is T34, and the following condition is satisfied:

$1.1<T23/T34<3.5$.

17. The image system lens assembly of claim 14, wherein an Abbe number of the first lens element is V1, an Abbe number of the second lens element is V2, an Abbe number of the fourth lens element is V4, and the following condition is satisfied:

$0.20<(V2+V4)/V1<1.0$.

18. The image system lens assembly of claim 14, wherein an axial distance between the object-side surface of the first lens element and the image-side surface of the fifth lens element is TD, the axial distance between the second lens element and the third lens element is T23, and the following condition is satisfied:

$1.5<TD/T23<5.0$.

19. The image system lens assembly of claim 14, wherein a curvature radius of an object-side surface of the fifth lens element is R9, a curvature radius of the image-side surface of the fifth lens element is R10, and the following condition is satisfied:

$(R9+R10)/(R9-R10)<0$.

20. The image system lens assembly of claim 14, wherein a focal length of the second lens element is f2, a focal length of the fifth lens element is f5, and the following condition is satisfied:

$0.80<|f2/f5|<3.0$.

21. The image system lens assembly of claim 14, further comprising an aperture stop being disposed at an object side of the second lens element, wherein half of a maximal field of view of the image system lens assembly is HFOV, an axial distance between the aperture stop and the image surface is SL, the axial distance between the object-side surface of the first lens element and the image surface is TL, and the following conditions are satisfied:

$10° < HFOV < 28°$;

$0.80 < SL/TL < 1.0$.

22. The image system lens assembly of claim 14, wherein the first lens element has positive refractive power, the focal length of the image system lens assembly is f, a focal length of the first lens element is f1, a curvature radius of the object-side surface of the first lens element is R1, and the following conditions are satisfied:

$1.5 < f/f1 < 3.5$;

$3.0 < f/R1 < 5.0$.

23. The image system lens assembly of claim 14, wherein the third lens element has negative refractive power, the focal length of the image system lens assembly is f, a focal length of the third lens element is f3, and the following condition is satisfied:

$-2.50 < f/f3 \le -0.60$.

24. The image system lens assembly of claim 14, wherein the fourth lens element has an image-side surface being convex in a paraxial region.

25. The image system lens assembly of claim 14, wherein the fifth lens element has negative refractive power.

26. An imaging apparatus, comprising the image system lens assembly of claim 14 and an image sensor disposed on the image surface of the image system lens assembly.

27. An electronic device, comprising the imaging apparatus of claim 26.

* * * * *